(12) United States Patent
Leonard et al.

(10) Patent No.: US 10,384,722 B2
(45) Date of Patent: Aug. 20, 2019

(54) VEHICLE

(71) Applicant: Polaris Industries Inc., Medina, MN (US)

(72) Inventors: Joshua J. Leonard, Blaine, MN (US); Richard R. Maki, North Branch, MN (US); Eric D. Bjerketvedt, North Branch, MN (US); Michael D. Schneider, Dalbo, MN (US); Bradley R. Morisch, Lindstrom, MN (US); Brian D. Krosschell, North Branch, MN (US)

(73) Assignee: Polaris Industries Inc., Medina, MN (US)

( * ) Notice: Subject to any disclaimer, the term of this patent is extended or adjusted under 35 U.S.C. 154(b) by 156 days.

(21) Appl. No.: 15/228,655

(22) Filed: Aug. 4, 2016

(65) Prior Publication Data
US 2016/0339960 A1 Nov. 24, 2016

Related U.S. Application Data

(60) Continuation of application No. 14/667,649, filed on Mar. 24, 2015, which is a continuation of application No. 13/233,415, filed on Sep. 15, 2011, now Pat. No. 9,004,510, which is a division of application No. 12/092,153, filed as application No. PCT/US2008/003483 on Mar. 17, 2008, now Pat. No. 8,029,021.
(Continued)

(51) Int. Cl.
*B62D 33/063* (2006.01)
*B62D 33/067* (2006.01)
(Continued)

(52) U.S. Cl.
CPC ............ *B62D 21/183* (2013.01); *B60G 3/20* (2013.01); *B60G 15/06* (2013.01); *B60G 15/067* (2013.01);
(Continued)

(58) Field of Classification Search
CPC .... B60G 15/067; B60G 13/00; B60G 13/001; B60G 13/003; B60G 2204/127;
(Continued)

(56) References Cited

U.S. PATENT DOCUMENTS 2,656,214 A * 10/1953 Alamagny ........... B62D 25/105
296/193.01
2,672,103 A 3/1954 Hohmes
(Continued)

FOREIGN PATENT DOCUMENTS

CA 2265693 1/2004
CH 317335 11/1956
(Continued)

OTHER PUBLICATIONS

Brochure, Fully Equipped LTATV Sales, Copyright 2010-2011, available at http://chrishainesoffroad.com/vehicles.pdf, last accessed Jul. 15, 2014; 2 pages.
(Continued)

*Primary Examiner* — Barry Gooden, Jr.
(74) *Attorney, Agent, or Firm* — Faegre Baker Daniels LLP

(57) ABSTRACT

A vehicle is disclosed. The vehicle may include a base portion and a modular portion. The base portion may be a four wheel vehicle having an operator area with seating for at least two occupants in a side-by-side arrangement. The modular portion may be coupled to the base portion resulting in a six wheel vehicle. The wheels of the modular portion may be powered by an engine of the base portion.

15 Claims, 40 Drawing Sheets

Related U.S. Application Data

(60) Provisional application No. 60/918,502, filed on Mar. 16, 2007.

(51) Int. Cl.

| | | |
|---|---|---|
| *B62D 33/077* | (2006.01) | |
| *B62D 21/18* | (2006.01) | |
| *B60G 3/20* | (2006.01) | |
| *B60G 15/06* | (2006.01) | |
| *B62D 21/12* | (2006.01) | |
| *B62D 21/14* | (2006.01) | |
| *B62D 55/04* | (2006.01) | |
| *B62D 61/10* | (2006.01) | |
| *B62D 61/12* | (2006.01) | |
| *F16D 55/226* | (2006.01) | |
| *B60K 17/16* | (2006.01) | |
| *B62D 63/02* | (2006.01) | |
| *B60R 21/13* | (2006.01) | |

(52) U.S. Cl.
CPC .............. *B60K 17/16* (2013.01); *B62D 21/12* (2013.01); *B62D 21/14* (2013.01); *B62D 33/063* (2013.01); *B62D 33/067* (2013.01); *B62D 33/077* (2013.01); *B62D 55/04* (2013.01); *B62D 61/10* (2013.01); *B62D 61/12* (2013.01); *B62D 63/025* (2013.01); *F16D 55/226* (2013.01); *B60G 2200/144* (2013.01); *B60G 2202/24* (2013.01); *B60G 2206/011* (2013.01); *B60G 2206/0114* (2013.01); *B60G 2300/13* (2013.01); *B60R 21/13* (2013.01)

(58) Field of Classification Search
CPC ............ B60G 2204/128; B60G 15/068; B62D 33/067; B62D 33/068; B62D 33/077
See application file for complete search history.

(56) References Cited

U.S. PATENT DOCUMENTS

| | | | | |
|---|---|---|---|---|
| 2,781,102 | A * | 2/1957 | Prichard | B62D 25/10 180/69.2 |
| 2,838,126 | A * | 6/1958 | Gleasman | B62D 33/067 180/89.14 |
| 3,259,211 | A | 7/1966 | Ryskamp | |
| 3,336,074 | A | 8/1967 | Barnes | |
| 3,858,902 | A | 1/1975 | Howells | |
| 3,917,310 | A | 11/1975 | Mitsuishi | |
| 4,027,892 | A | 6/1977 | Parks | |
| 4,089,542 | A | 5/1978 | Westerman | |
| 4,098,414 | A | 7/1978 | Abiera | |
| 4,222,451 | A * | 9/1980 | Lamb | B62D 33/067 180/89.18 |
| 4,340,124 | A | 7/1982 | Leonard | |
| 4,561,323 | A | 12/1985 | Stromberg | |
| 4,626,024 | A | 12/1986 | Swann | |
| 4,695,089 | A | 9/1987 | Fukutomi | |
| 4,700,982 | A | 10/1987 | Kuraoka | |
| 4,821,825 | A | 4/1989 | Somerton-Rayner | |
| 4,934,737 | A | 6/1990 | Nakatsuka | |
| 5,036,939 | A | 8/1991 | Johnson | |
| 5,042,835 | A | 8/1991 | Burns | |
| 5,251,713 | A | 10/1993 | Enokimoto | |
| 5,393,194 | A | 2/1995 | Smith | |
| 5,573,300 | A | 11/1996 | Simmons | |
| 5,779,272 | A | 7/1998 | Panek | |
| 5,842,732 | A | 12/1998 | Daggett | |
| 5,863,277 | A | 1/1999 | Melbourne | |
| 5,950,750 | A | 9/1999 | Dong | |
| 5,954,364 | A * | 9/1999 | Nechushtan | B60R 21/13 280/781 |
| 5,971,434 | A | 10/1999 | Neufeld | |
| 6,029,750 | A | 2/2000 | Carrier | |
| 6,092,877 | A | 7/2000 | Rasidescu | |
| 6,116,627 | A * | 9/2000 | Kawabe | B60G 3/20 280/124.1 |
| 6,126,227 | A | 10/2000 | Bitelli | |
| 6,149,540 | A | 11/2000 | Johnson | |
| 6,199,894 | B1 | 3/2001 | Anderson | |
| 6,293,605 | B2 | 9/2001 | Neubrand | |
| 6,416,108 | B1 | 7/2002 | Elswick | |
| 6,467,787 | B1 | 10/2002 | Marsh | |
| 6,557,922 | B1 | 5/2003 | Hommel | |
| 6,622,968 | B1 | 9/2003 | St. Clair | |
| 6,695,566 | B2 | 2/2004 | Navio | |
| 6,725,962 | B1 | 4/2004 | Fukuda | |
| 6,752,235 | B1 | 6/2004 | Bell | |
| 6,786,526 | B1 | 9/2004 | Blalock | |
| 6,799,779 | B2 | 10/2004 | Shibayama | |
| 6,799,781 | B2 | 10/2004 | Rasidescu | |
| 6,916,142 | B2 | 7/2005 | Hansen | |
| 6,923,507 | B1 | 8/2005 | Billberg | |
| 6,978,857 | B2 | 12/2005 | Korenjak | |
| 7,055,454 | B1 | 6/2006 | Whiting | |
| 7,124,853 | B1 | 10/2006 | Kole, Jr. | |
| 7,125,134 | B1 | 10/2006 | Hedlund | |
| 7,165,702 | B1 | 1/2007 | Billberg | |
| 7,210,547 | B2 | 5/2007 | Nojima | |
| 7,222,882 | B2 | 5/2007 | Boucher | |
| 7,237,789 | B1 | 7/2007 | Herman | |
| 7,239,032 | B1 | 7/2007 | Wilson | |
| 7,240,472 | B2 | 7/2007 | Evers | |
| 7,240,960 | B2 | 7/2007 | Fallis | |
| 7,431,024 | B2 | 10/2008 | Buchwitz | |
| 7,500,709 | B2 | 3/2009 | Heselhaus | |
| 7,559,596 | B2 | 7/2009 | Garska | |
| 7,568,732 | B2 | 8/2009 | Schlup, Jr. | |
| 7,578,523 | B2 | 8/2009 | Kosuge | |
| 7,665,792 | B1 | 2/2010 | Flynn | |
| 7,677,599 | B2 | 3/2010 | Kurten | |
| 7,677,634 | B2 | 3/2010 | Flynn | |
| 7,871,106 | B2 | 1/2011 | Leonard | |
| RE42,086 | E | 2/2011 | Saito | |
| 7,896,422 | B2 | 3/2011 | Willard | |
| 7,922,201 | B2 | 4/2011 | Kurten | |
| 7,967,365 | B2 | 6/2011 | Gerhardt | |
| 7,971,904 | B2 | 7/2011 | David | |
| 8,191,952 | B2 | 6/2012 | Mokhtari | |
| 8,353,534 | B2 | 1/2013 | Arnold | |
| 8,544,582 | B2 | 10/2013 | Kaku | |
| 8,596,709 | B2 | 12/2013 | Ugolini | |
| 2002/0011374 | A1* | 1/2002 | Brister | B62D 21/183 180/291 |
| 2002/0147072 | A1 | 10/2002 | Goodell | |
| 2002/0178968 | A1 | 12/2002 | Christensen | |
| 2003/0001409 | A1 | 1/2003 | Semple | |
| 2004/0079561 | A1 | 4/2004 | Ozawa | |
| 2004/0010815 | A1 | 6/2004 | Rondeau | |
| 2004/0195797 | A1 | 10/2004 | Nash | |
| 2005/0073140 | A1 | 4/2005 | Boucher | |
| 2005/0173177 | A1 | 8/2005 | Smith | |
| 2005/0173180 | A1 | 8/2005 | Hypes | |
| 2005/0248116 | A1 | 11/2005 | Fanson | |
| 2006/0001223 | A1* | 1/2006 | Krieger | B60G 3/20 280/6.15 |
| 2006/0043754 | A1 | 3/2006 | Smith | |
| 2006/0066069 | A1* | 3/2006 | Yanai | B62K 5/01 280/124.135 |
| 2007/0290493 | A1 | 12/2007 | David | |
| 2008/0023240 | A1 | 1/2008 | Sunsdahl | |
| 2008/0023249 | A1 | 1/2008 | Sunsdahl | |
| 2009/0000849 | A1 | 1/2009 | Leonard | |
| 2009/0195022 | A1* | 8/2009 | Bell | B62D 33/067 296/190.06 |
| 2009/0195024 | A1* | 8/2009 | Cott | E02F 9/24 296/190.08 |
| 2009/0302590 | A1 | 12/2009 | Van Bronkhorst | |
| 2010/0019539 | A1 | 1/2010 | Nakamura | |

(56) References Cited

U.S. PATENT DOCUMENTS

| 2010/0060026 | A1  | 3/2010 | Bowers |           |
|--------------|-----|--------|--------|-----------|
| 2010/0090430 | A1  | 4/2010 | Weston |           |
| 2017/0166255 | A1* | 6/2017 | Peterson | B60R 21/13 |

FOREIGN PATENT DOCUMENTS

| DE | 116605       | 2/1900  |
| DE | 1755101      | 4/1971  |
| DE | 3033707      | 4/1982  |
| DE | 102010017784 | 1/2012  |
| EP | 0238077      | 9/1987  |
| EP | 0709247      | 5/1996  |
| EP | 0794096      | 9/1997  |
| EP | 1215107      | 6/2002  |
| EP | 1557345      | 7/2005  |
| EP | 1564123      | 8/2005  |
| JP | H11334447    | 12/1999 |
| JP | 2000177434   | 6/2000  |
| JP | 3385382      | 3/2003  |
| JP | 2007038709   | 2/2007  |
| WO | WO 2008/013564 | 1/2008 |

OTHER PUBLICATIONS

Webpage, RP Advanced Mobile Systems: Military SxS Light Tactical Defense Vehicles, available at least as early as Mar. 24, 2012, available at https://web.archive.org/web/20120324210549/http://www.rpadvancedmobilessystems.com, last accessed Jul. 15, 2014; 4 pages.

Brochure, Strike Razor, Advanced Mobile Systems for Rapid Response; 5 pages.

International Search Report and Written Opinion issued by the International Searching Authority, dated Aug. 27, 2008, for related International Patent Application No. PCT/US2008/003485; 15 pages.

Written Opinion issued by the International Searching Authority, dated Sep. 1, 2008, for related International Patent Application No. PCT/US2008/003480; 19 pages.

International Search Report and Written Opinion issued by the International Searching Authority, dated Oct. 2, 2008, for related International Patent Application No. PCT/US2008/003483; 18 pages.

Strike Razor: Light Tactical Vehicle, Advanced Mobile Systems, copyright 2011; 2 pages.

International Preliminary Report on Patentability issued by the International Searching Authority, dated Nov. 19, 2014, for related International Patent Application No. PCT/US2013/034530, 15 pages.

Written Opinion issued by the International Searching Authority, dated Nov. 19, for related International Patent Application No. PCT/US2013/034530; 6 pages.

International Search Report issued by the International Searching Authority, dated Mar. 27, 2014, for related International Patent Application No. PCT/US2013/034530; 4 pages.

* cited by examiner

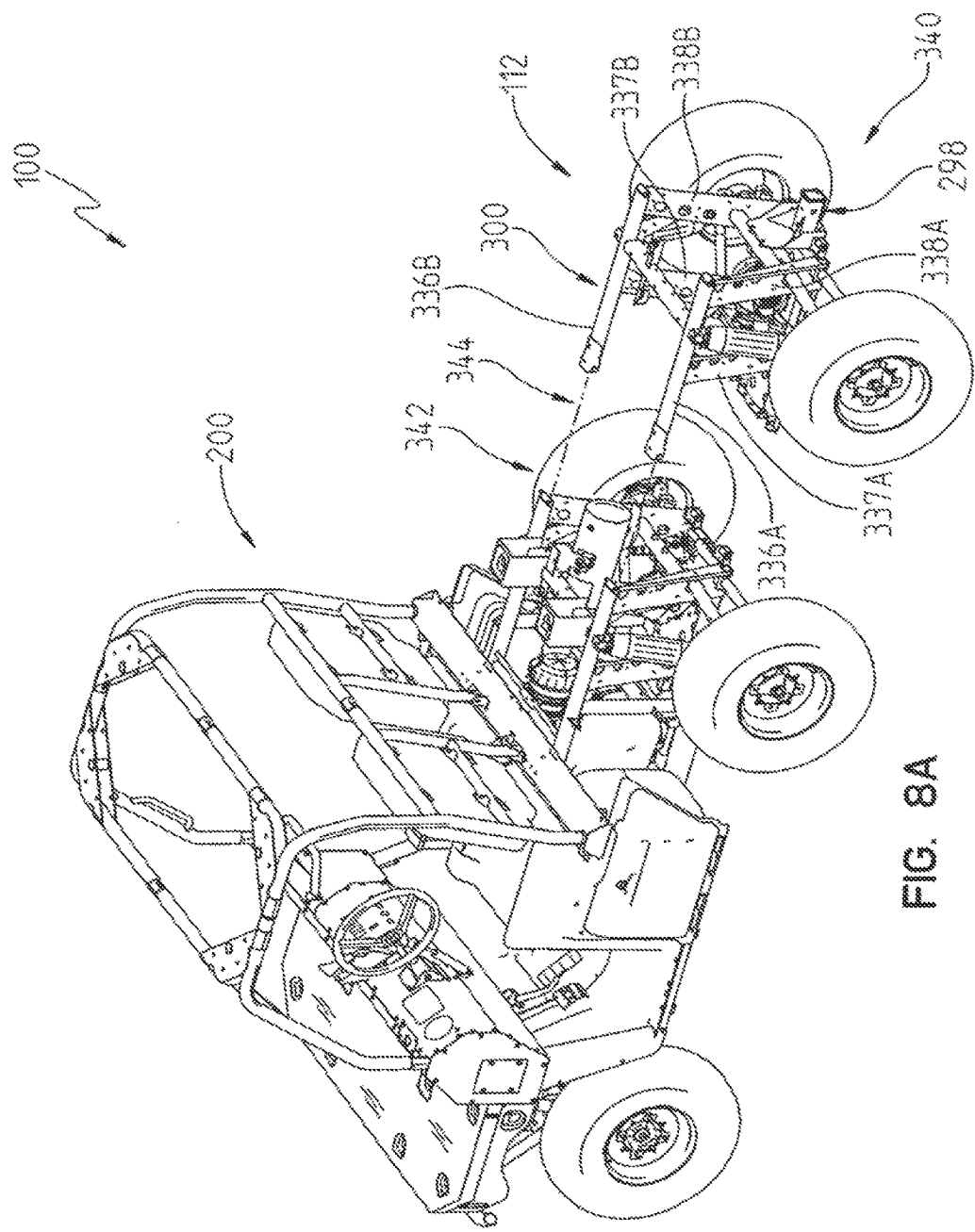

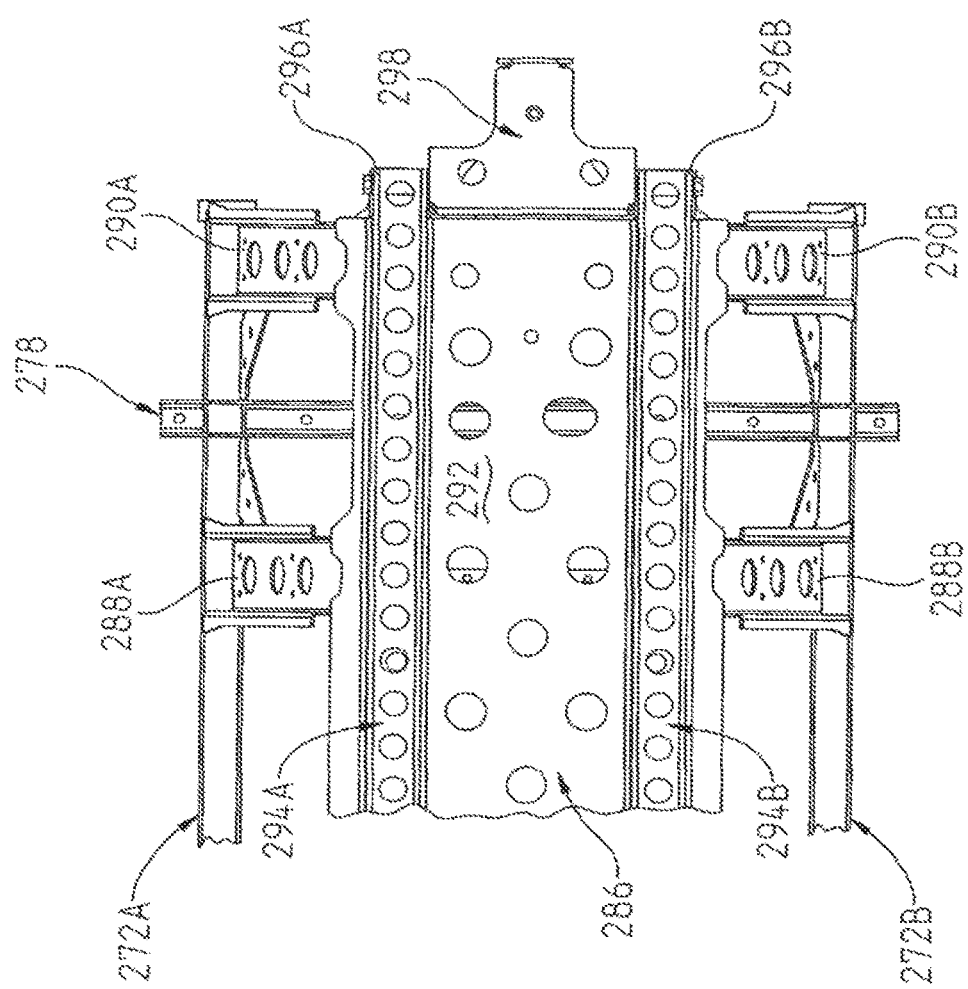

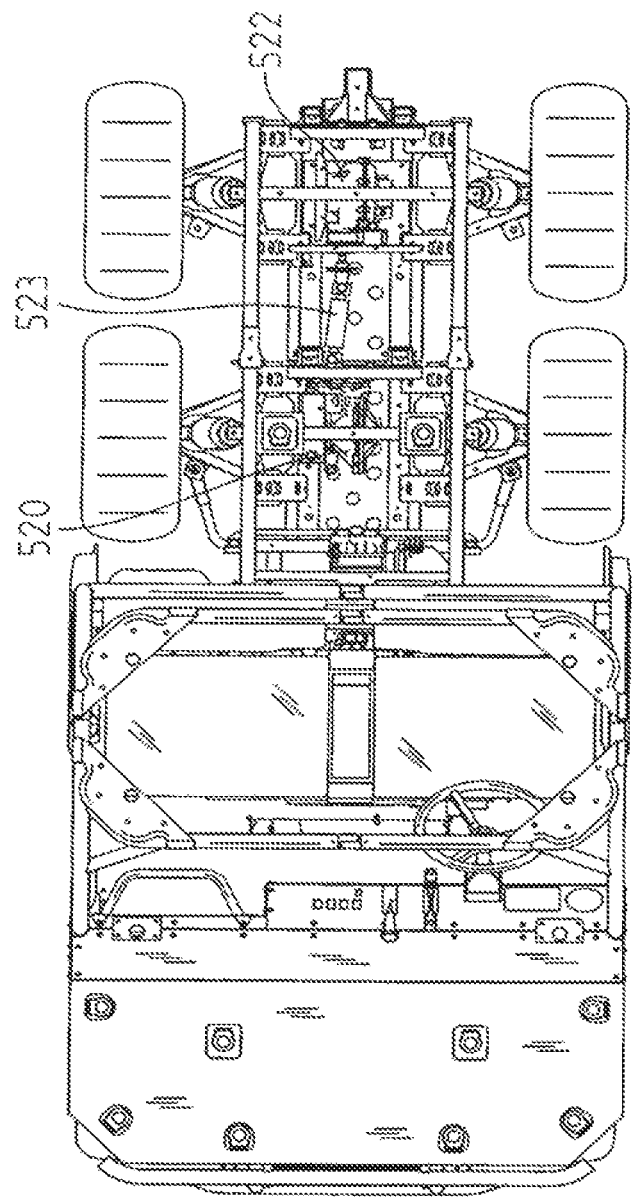

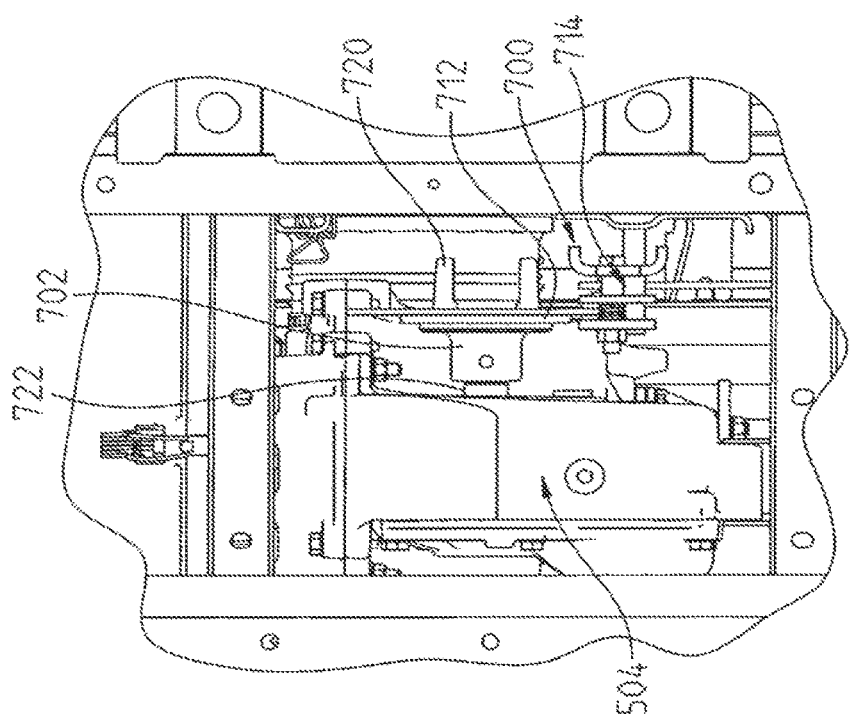

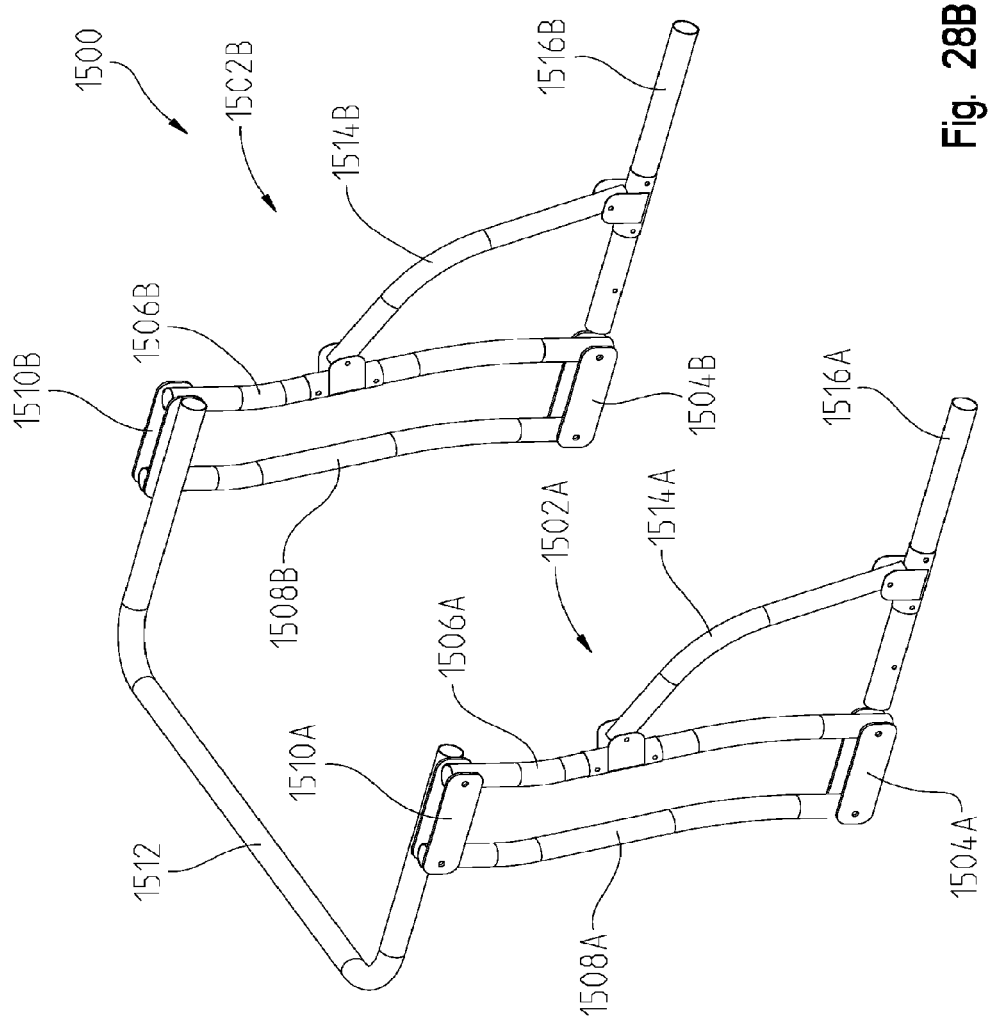

VEHICLE

CROSS-REFERENCE TO RELATED APPLICATIONS

The present application is a continuation of U.S. patent application Ser. No. 14/667,649, filed Mar. 24, 2015, which is a continuation of U.S. patent application Ser. No. 13/233,415, filed Sep. 15, 2011, which is a divisional application of U.S. patent application Ser. No. 12/092,153, filed Sep. 2, 2008 which is a National Stage Application of International Application No. PCT/US08/03483, filed Mar. 17, 2008, titled VEHICLE, and claims the benefit of U.S. Provisional Application Ser. No. 60/918,502, filed Mar. 16, 2007, the disclosures of which are expressly incorporated by reference herein.

STATEMENT REGARDING FEDERALLY SPONSORED RESEARCH OR DEVELOPMENT

Portions of this application may be subject to the terms of contract number H92222-06-C-0039 with the United States Special Operations Command (SOCOM).

The present application is related to U.S. Provisional Application Ser. No. 60/918,556, filed Mar. 16, 2007, titled "VEHICLE"; U.S. Provisional Application Ser. No. 60/918,444, filed Mar. 16, 2007, titled "VEHICLE WITH SPACE UTILIZATION"; U.S. Provisional Application Ser. No. 60/918,356, filed Mar. 16, 2007, titled "UTILITY VEHICLE HAVING MODULAR COMPONENTS", U.S. Provisional Application Ser. No. 60/918,500, filed Mar. 16, 2007, titled "METHOD AND APPARATUS RELATED TO TRANSPORTABILITY OF A VEHICLE", the disclosures of which are expressly incorporated by reference herein.

FIELD OF THE INVENTION

The present invention relates generally to a vehicle and in particular to a reconfigurable vehicle.

BACKGROUND AND SUMMARY OF THE INVENTION

The present disclosure relates to vehicles, and more particularly to utility vehicles. It is known to provide utility vehicles which are 4 wheel drive and 6 wheel drive. It is desired to provide a vehicle which is easily convertible between the two. It would also be preferred to have such features as independent suspension systems available.

An exemplary vehicle is a vehicle having a base portion and a modular portion. In an exemplary embodiment, a vehicle is convertible between a base vehicle, such as a four wheel vehicle, and an extended vehicle, such as a six wheel vehicle.

Utility vehicles are available which comprise a plurality of ground engagement members, a main frame supported by a first portion of the plurality of ground engagement members, an engine supported by the main frame and configured to provide power to at least one of the plurality of ground engaging members, an operator area supported by the main frame, the operator area including seating for at least two occupants in a side-by-side arrangement, steering controls operatively coupled to at least a portion of the plurality of ground engagement members, and engine controls operatively coupled to the engine. For example, a utility vehicle of the type disclosed above is shown in our U.S. Pat. No. 6,923,507.

The present disclosure further discloses a modular frame supported by a second portion of the ground engaging members, where the modular frame is removably coupled to the main frame through at least three spaced apart connections which substantially prevent the modular subsection from pivoting relative to the main frame when the modular subsection is coupled to the main frame.

In an exemplary embodiment of the present disclosure, a utility vehicle is disclosed, comprising a plurality of ground engagement members; a main frame supported by a first portion of the plurality of ground engagement members; a modular frame supported by a second portion of the ground engaging members; an engine supported by the main frame and configured to provide power to at least one of the plurality of ground engaging members; and an operator area supported by the main frame. The operator area including seating for at least two occupants in a side-by-side arrangement. The operator area further including steering controls operatively coupled to at least a portion of the plurality of ground engagement members. The operator area further including engine controls operatively coupled to the engine. The modular frame being removably coupled to the main frame through at least three spaced apart connections which substantially prevent the modular subsection from pivoting relative to the main frame when the modular subsection is coupled to the main frame.

In another exemplary embodiment of the present disclosure, a utility vehicle is disclosed. The utility vehicle comprising a plurality of ground engagement members; a main frame supported by a first portion of the plurality of ground engagement members; a modular frame supported by a second portion of the ground engaging members; and an engine supported by the main frame and configured to provide power to at least one of the first portion of the plurality of ground engaging members and to at least one of the second portion of the plurality of ground engaging members. The modular frame being removably coupled to the main frame through at least three spaced apart connections which substantially prevent the modular subsection from pivoting relative to the main frame when the modular subsection is coupled to the main frame.

In a further exemplary embodiment of the present disclosure, a vehicle is disclosed. The vehicle comprising a plurality of ground engagement members; a frame supported by a first portion of the plurality of ground engagement members; an engine supported by the frame and configured to provide power to at least one of the plurality of ground engaging members; an operator area supported by the main frame and at least a first suspension system operatively coupled to a first ground engaging member and the frame. The operator area including seating for at least two occupants in a side-by-side arrangement, steering controls operatively coupled to at least a portion of the plurality of ground engagement members, and engine controls operatively coupled to the engine. The first suspension system including a control arm moveably coupled to the frame and moveably coupled to the first ground engaging member and a shock member moveably coupled to the frame and moveably coupled to the control arm. The frame and the control arm cooperate to provide multiple shock orientations.

In yet another exemplary embodiment of the present disclosure, a method of configuring a vehicle is provided. The method comprising the steps of providing a functional base vehicle portion; providing a modular vehicle portion; and coupling a modular frame of the modular vehicle portion to a main frame of the functional base vehicle portion to substantially prevent the modular frame from pivoting relative to the main frame. The functional base portion including a first plurality of ground engaging members, the main frame supported by the first plurality of ground engaging members, an engine supported by the main frame and operatively coupled to at least one of the first plurality of ground engaging members; and an operator area supported by the main frame. The operator area including seating for at least two occupants in a side-by-side arrangement, steering controls operatively coupled to at least a portion of the first plurality of ground engagement members, and engine controls operatively coupled to the engine. The modular vehicle portion including a second plurality of ground engaging members and a modular frame supported by the second plurality of ground engaging members.

In still another exemplary embodiment of the present disclosure, a utility vehicle is provided. The utility vehicle comprising a plurality of ground engagement members arranged on a front axle, a rear axle, and at least one intermediate axle; a frame supported by the plurality of ground engagement members; an engine supported by the main frame and configured to provide power to the vehicle; a first differential operably coupled to two of the plurality of ground engagement members; a transmission operably coupled to the engine; a first drive shaft operably coupled to the transmission and to the first differential; a parking brake having a disc coupled to the drive shaft; and a control module coupled to the first differential and the parking brake. The control module locking the first differential in response to a detection that the parking brake has been set.

In yet a further exemplary embodiment of the present disclosure, a utility vehicle is disclosed. The utility vehicle comprising a plurality of ground engagement members arranged on a front axle, a rear axle, and at least one intermediate axle; a frame supported by the plurality of ground engagement members; and an engine supported by the frame and configured to provide power to at least the rear axle through a first differential. The rear axle includes at least a first ground engaging member positioned on a first side of the first differential and at least a second ground engaging member positioned on a second side of the first differential. The utility vehicle further comprising an operator area supported by the main frame. The operator area including seating for at least two occupants in a side-by-side arrangement, steering controls operatively coupled to at least a portion of the plurality of ground engagement members, and engine controls operatively coupled to the engine. The utility vehicle further comprising a first suspension operatively coupling the first ground engaging member to the frame and a second suspension operatively coupling the second ground engaging member to the frame. The second suspension being independent of the first suspension.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 8A is a perspective view of the vehicle of FIG. 1 illustrating a base portion comprising a 4×4 and a modular sub-section spaced apart therefrom.

FIG. 11A is a bottom, partial view of the base frame of FIG. 9.

FIG. 16B is a top view of the vehicle 100 with the exhaust removed.

FIG. 25 is a bottom view of the vehicle of FIG. 1, illustrating an exemplary parking brake.

FIG. 28B is a front perspective view of a second exemplary collapsible roll cage, the roll cage being in a raised configuration.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, and golf carts.

Figure 1:
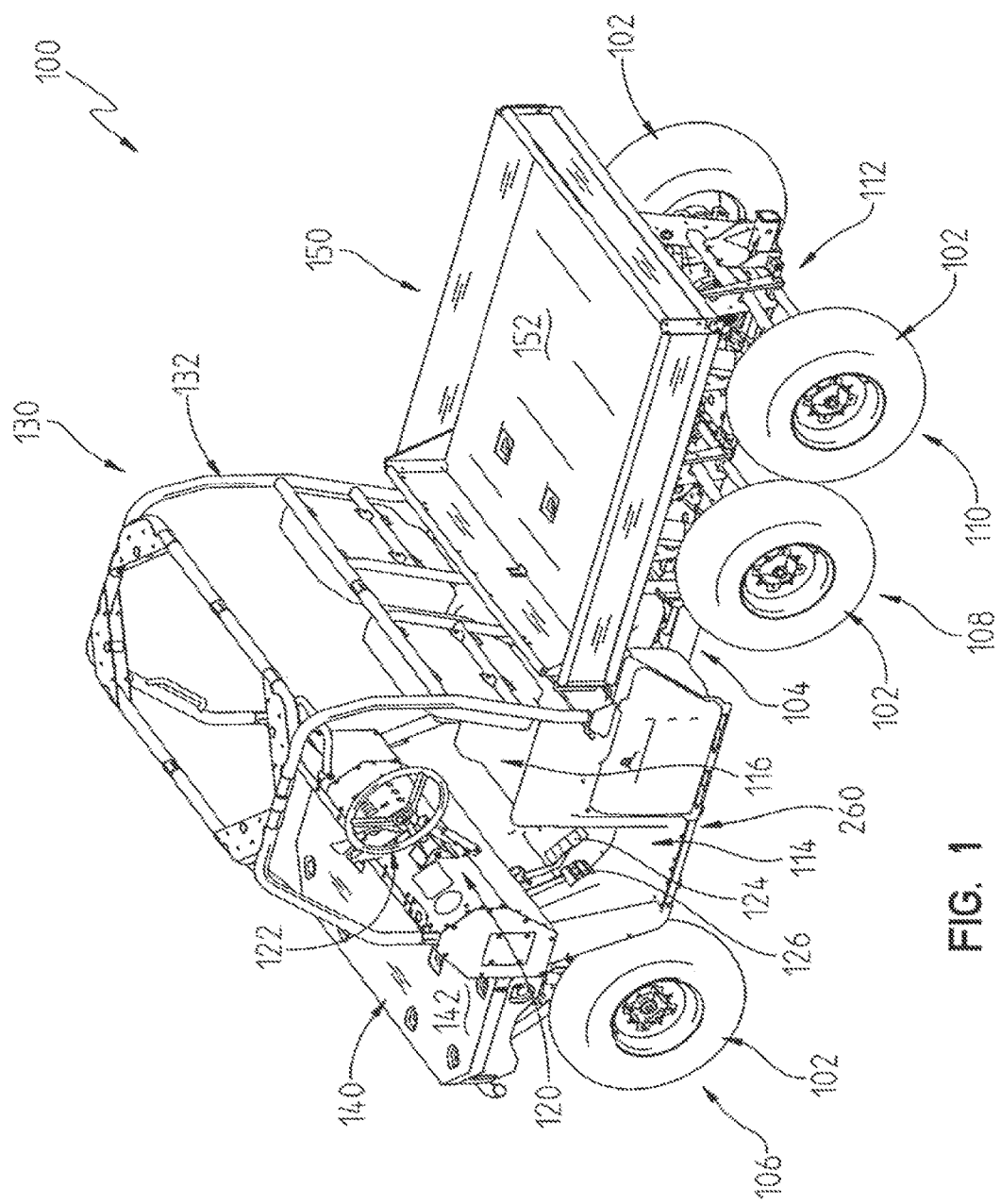
FIG. 1 is a rear, perspective view of a vehicle from a first side of the vehicle, the vehicle including a front platform and a rear platform.

Referring to FIG. 1, an illustrative embodiment of a vehicle 100 is shown. Vehicle 100 as illustrated includes a plurality of ground engaging members 102, illustratively wheels. A first set of wheels, one on each side of vehicle 100, generally correspond to a front axle 106. A second set of wheels, one on each side of vehicle 100, generally correspond to a middle axle 108. A third set of wheels, one on each side of vehicle 100, generally correspond to a rear axle 110. In one embodiment, the wheels include run flat tires.

In one embodiment, one or more of the wheels may be replaced with tracks, such as the PROSPECTOR II tracks available from Polaris Industries, Inc. located at 2100 Highway 55 in Medina, Minn. 55340. In one embodiment, a track is placed around the ground engaging members of middle axle 108 and rear axle 110 on each side of vehicle 100.

Figure 8B:
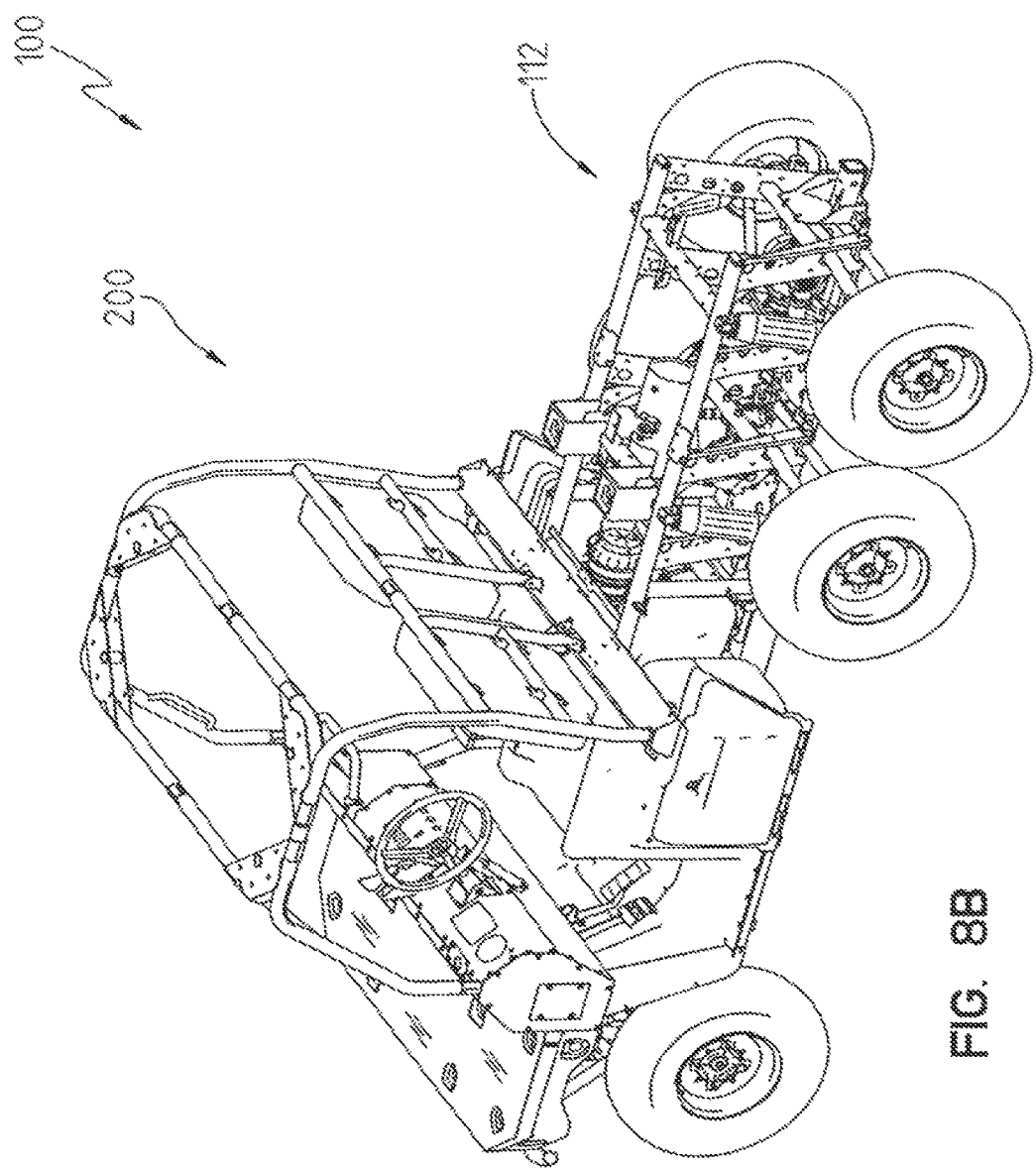
FIG. 8B is the view of FIG. 8A with the modular sub-section coupled to the base portion resulting in a 6×6 vehicle.

Vehicle 100 further includes a frame 104 supported by the plurality of ground engaging members 102. Referring to FIG. 8A, vehicle 100 includes a base portion 200 and a modular subsection 112 including rear axle 110. Modular subsection 112 may be removed from the remainder of vehicle 100 to convert vehicle 100 from a six-wheeled vehicle to a four-wheeled vehicle. Further, additional modular subsections 112 may be added to vehicle 100 to convert vehicle 100 from a six-wheeled vehicle to an eight-wheeled vehicle or more.

Figure 2:
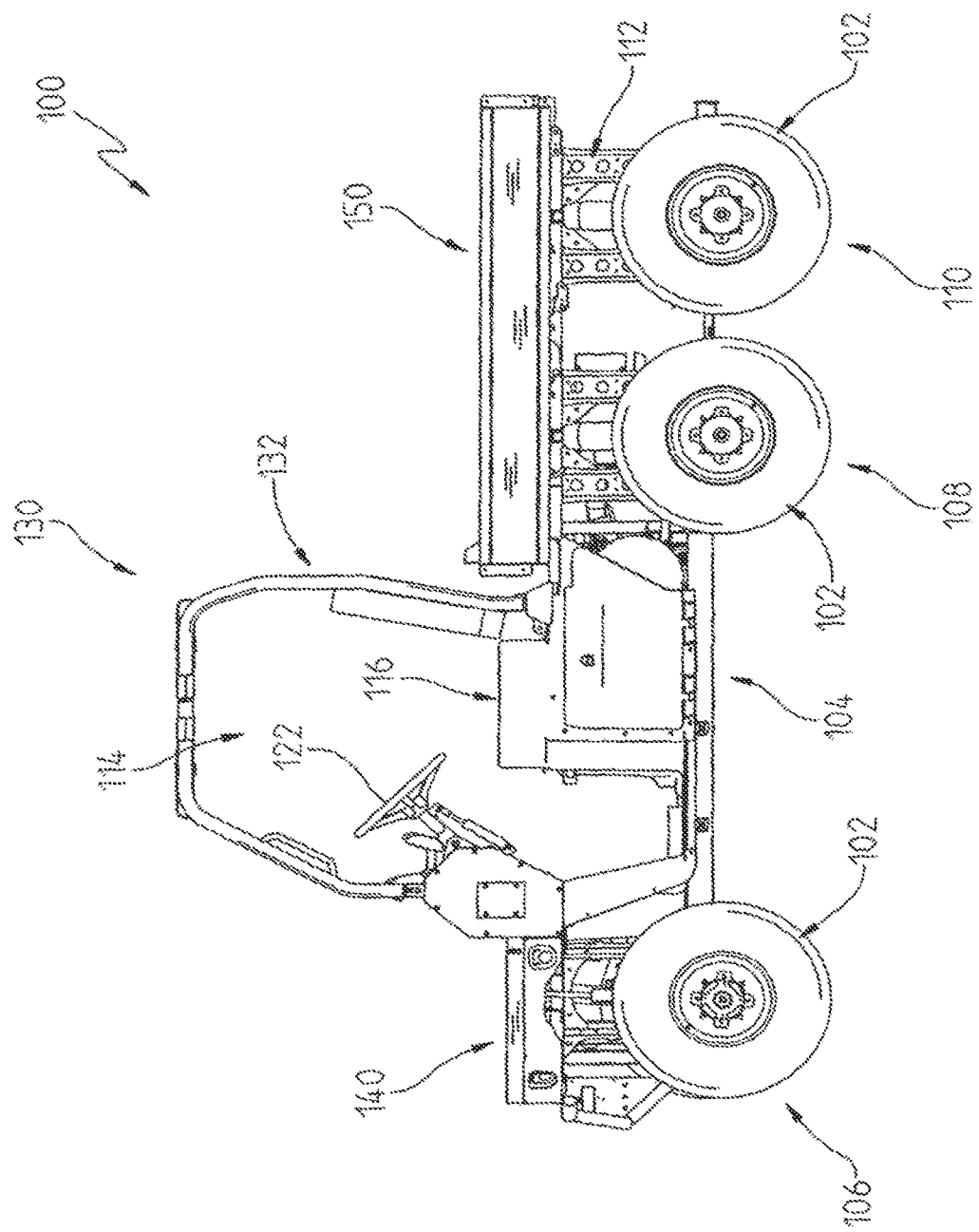
FIG. 2 is a side view of the first side of the vehicle of FIG. 1.
Figure 3:
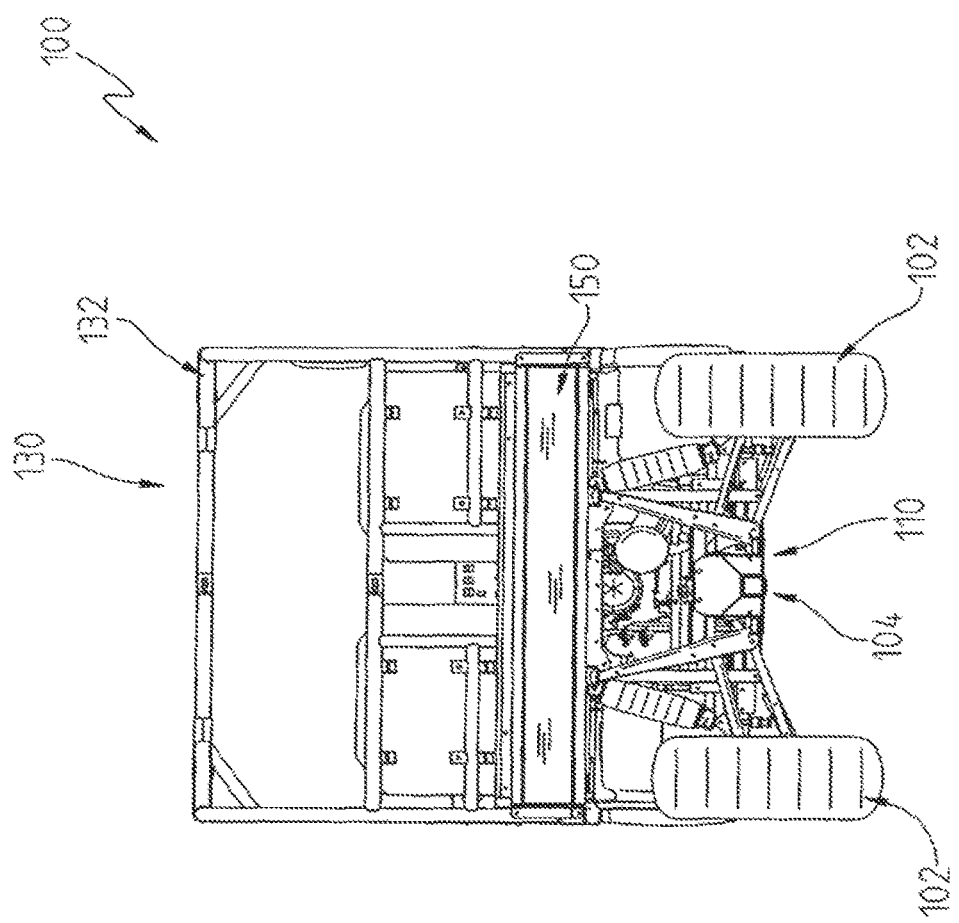
FIG. 3 is a rear view of the vehicle of FIG. 1.
Figure 4:
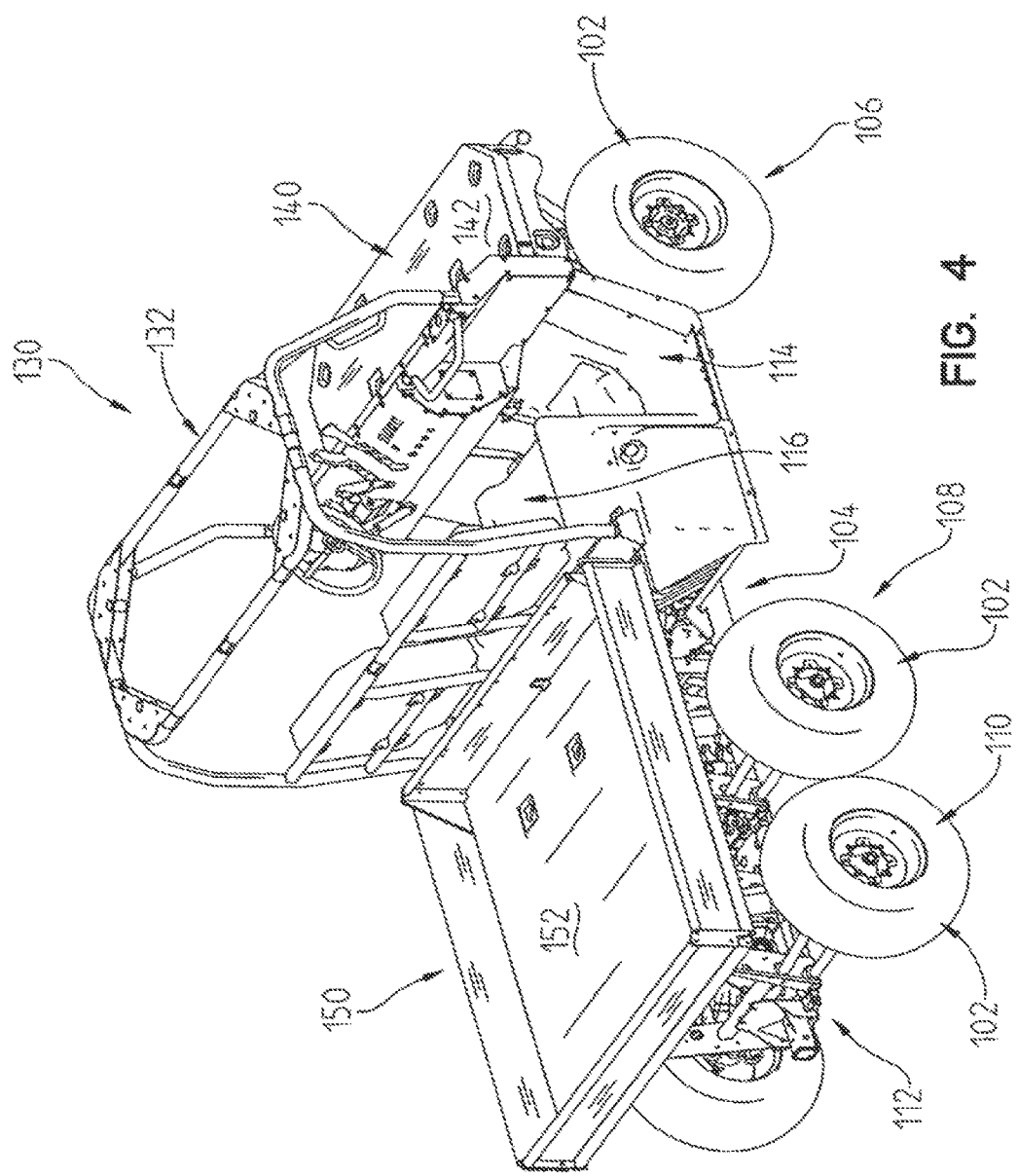
FIG. 4 is a rear, perspective view of the vehicle of FIG. 1 from a second side of the vehicle.

The height of vehicle 100 in FIG. 2 is about 75 inches from the bottom of ground engaging members 102 to the top of roll cage 132.

Vehicle 100 includes an operator area 114 which includes seating 116 for one or more passengers. Operator area 114 further includes a plurality of operator controls 120 by which an operator may provide input into the control of vehicle 100. Controls 120 include a steering wheel 122 which is rotated by the operator to change the orientation of one or more of ground engaging members 102, such as the wheels associated with front axle 106, to steer vehicle 100.

In one embodiment, steering wheel 122 changes the orientation of the wheels of axle 106 and axle 108 to provide four wheel steering. In one embodiment, steering wheel 122 changes the orientation of the wheels of axles 106, 108, and 110 to provide six wheel steering.

Controls 120 also include a first foot pedal 124 actuatable by the operator to control the acceleration and speed of vehicle 100 through the control of an engine 500 described in more detail herein and a second foot pedal 126 actuatable by the operator to decelerate vehicle 100 through a braking system described in more detail herein. Additional details regarding the operator area 114, including controls 120, are provided in U.S. Provisional Application Ser. No. 60/918,556, filed Mar. 16, 2007, titled "VEHICLE", and U.S. Provisional Application Ser. No. 60/918,444, filed Mar. 16, 2007, titled "VEHICLE WITH SPACE UTILIZATION".

Frame 104 includes a portion 130 extending above operator area 114. Portion 130 is provided to protect the occupants of operator area 114 if vehicle 100 tips or rolls over. In the illustrated embodiment, portion 130 is a roll cage 132. In one embodiment, portion 130 is moveable from a first position protecting operator area 114 to a second position which provides vehicle 100 with a smaller envelope than when portion 130 is in the first position. Additional details about exemplary configurations of portion 130 are provided in U.S. Provisional Application Ser. No. 60/918,500, filed Mar. 16, 2007, titled "METHOD AND APPARATUS RELATED TO TRANSPORTABILITY OF A VEHICLE".

Vehicle 100 further includes a front platform 140 supported by frame 104 and a rear platform 150 supported by frame 104. Both front platform 140 and rear platform 150 are shown having a support surface 142 and 152, respectively. Support surfaces 142 and 152 may be flat, contoured, and/or comprised of several sections. In addition, one or both of front platform 140 and rear platform 150 may include upstanding walls to define a cargo box extending over at least a portion of the respective platform 140 and 150.

Further, portions of front platform 140 and rear platform 150, along with portion 130 of frame 104, may include devices for attaching various types of assets to vehicle 100. Exemplary assets include cargo containers, seats, gun mounts, footrests, and other suitable assets. Additional details regarding front platform 140 and rear platform 150 are provided in U.S. Provisional Application Ser. No. 60/918,556, filed Mar. 16, 2007, titled "VEHICLE"; U.S. Provisional Application Ser. No. 60/918,444, filed Mar. 16, 2007, titled "VEHICLE WITH SPACE UTILIZATION"; and/or U.S. Provisional Application Ser. No. 60/918,356, filed Mar. 16, 2007, titled "UTILITY VEHICLE HAVING MODULAR COMPONENTS".

Referring to FIG. 8A, vehicle 100 is shown having modular sub-section 112 spaced apart from the remainder or base portion 200 of vehicle 100. As explained in more detail herein the base portion 200 of vehicle 100 includes all of the components required to operate vehicle 100. As such, an operator could remove modular sub-section 112 from the base portion 200 and still have an operational vehicle. Further, as explained in more detail herein modular subsection 112 may be quickly added to or removed from base portion 200.

Figure 9:
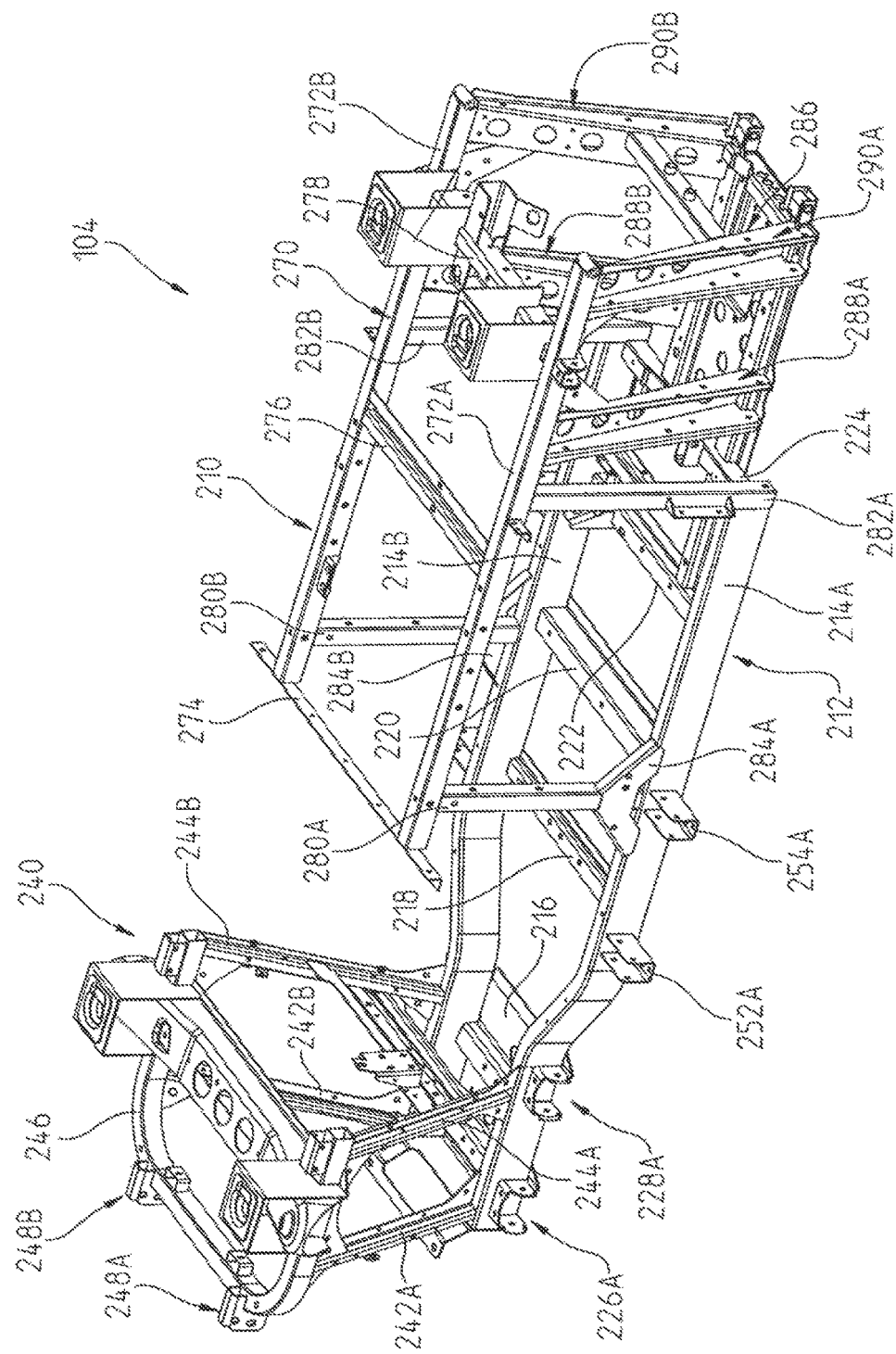
FIG. 9 is a first perspective view of a base frame of the base portion of FIG. 8A.

Referring to FIG. 9, a base frame 210 of frame 104 is shown. Base frame 210 includes a lower frame 212 including a first longitudinal frame member 214A and a second longitudinal frame member 214B. Frame members 214A and 214B are mirror images of each other. Frame members 214A and 214B are coupled together through a front skid plate 216 and cross members 218, 220, 222, and 224. Skid plate 216 and cross members 218, 220, 222, and 224 may be secured to frame members 214A and 214B through any suitable method, such as welding, or by fasteners, such as bolts.

Figure 5:
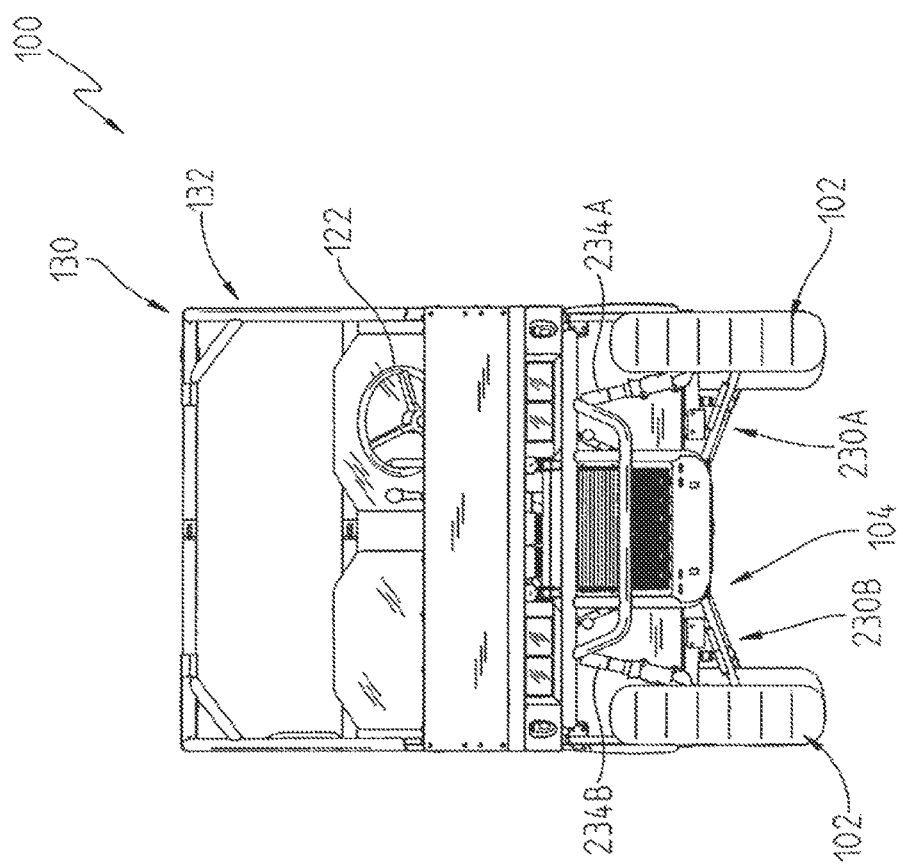
FIG. 5 is a front view of the vehicle of FIG. 1.
Figure 6:
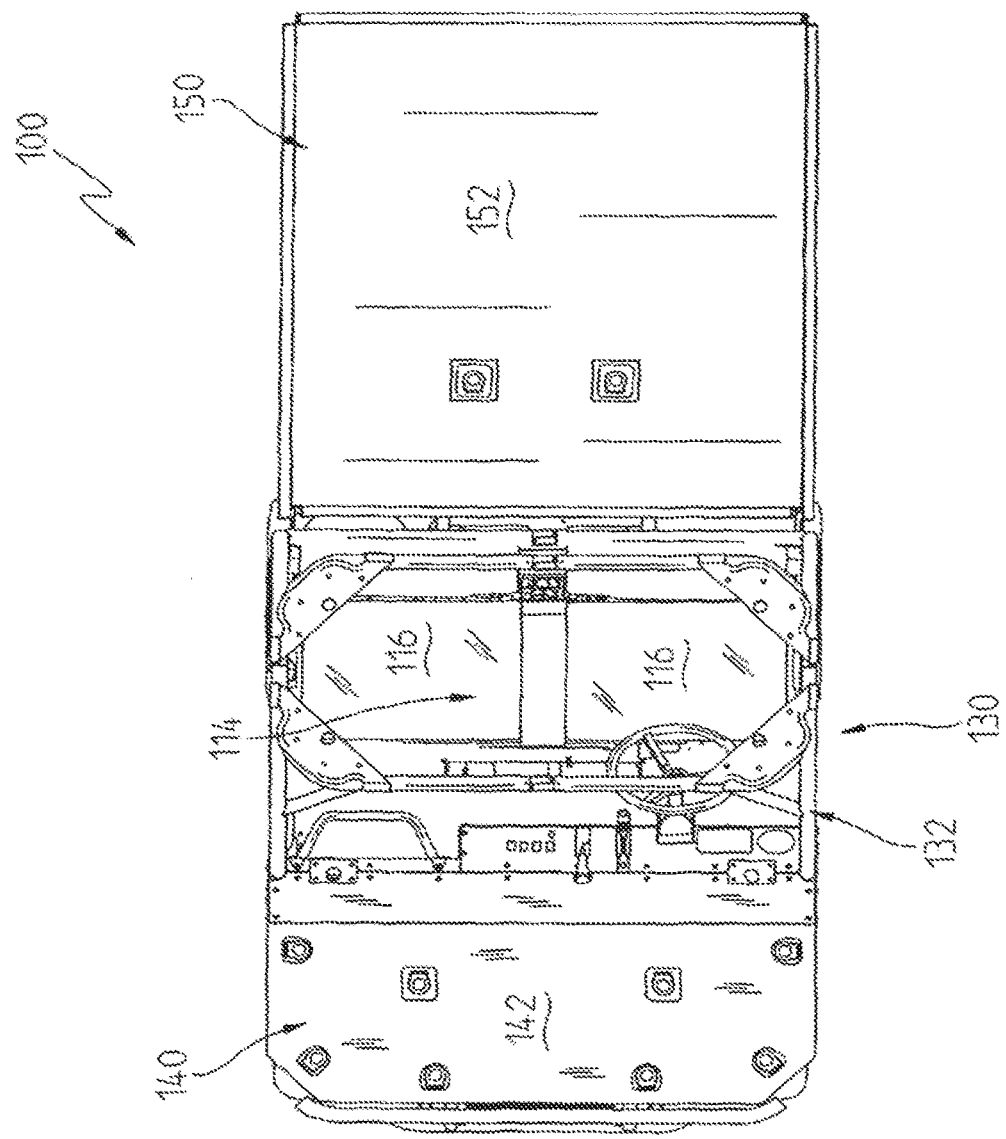
FIG. 6 is a top view of the vehicle of FIG. 1.
Figure 20:
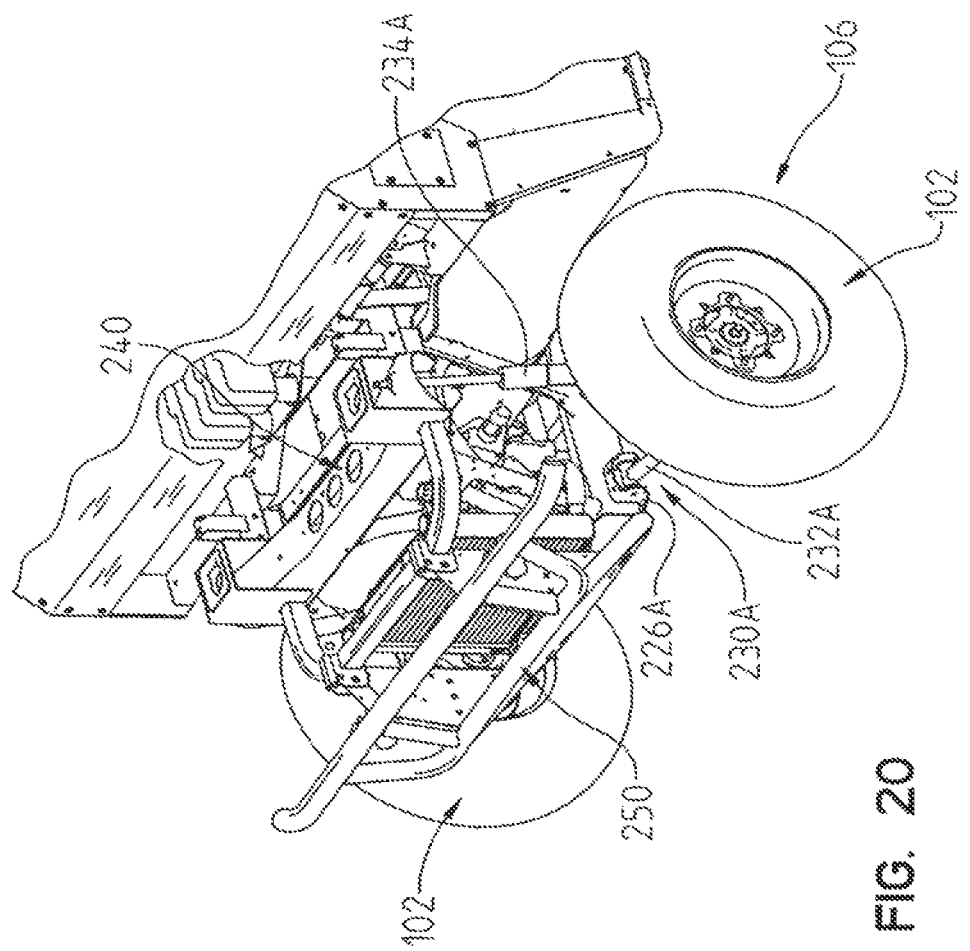
FIG. 20 is a partial front, perspective view of vehicle 100 with the front platform removed.

Attachment locations 226A and 228A are provided in base frame 210 for attaching a front suspension 230A which is in turn coupled to front ground engaging member 102. Illustratively, attachment locations 226A and 228A are provided as apart of skid plate 216. FIGS. 5 and 20 show front suspension 230A including a single A-frame member 232A rotatably coupled to base frame 210 and a shock 234A extending between A-frame member 232A and an upper frame member 240. Suspension 230A is a mirror image of suspension 230B and operates independently thereof. The front ground engaging members 102 of front axle 106 are coupled to steering wheel 122 through a steering assembly, such that ground engaging members 102 may both rotate to the left or right of the straight on position shown in FIG. 5 to change the direction of travel of vehicle 100.

Returning to FIG. 9, an upper frame member 240 is supported by lower frame 212 through a plurality of upwardly-extending frame members 242A, 242B, 244A, and 244B and a generally U-shaped frame member 246. Frame member 246 includes attachment locations 248A and 248B to which a front bumper assembly 250 (see FIG. 20) is attached.

Frame members 214A and 214B also have attachment locations 252 and 254 (252A and 254A shown in FIG. 9) to which an operator cab frame 260 is attached. Operator cab frame 260 includes portion 130 of frame 104. In one embodiment, roll cage 132 of portion 130 is a generally fixed roll cage. In one embodiment, roll cage 132 of portion 130 is a collapsible roll cage. Additional details concerning exemplary collapsible roll cages are provided in U.S. Provisional Application Ser. No. 60/918,500, filed Mar. 16, 2007, titled "METHOD AND APPARATUS RELATED TO TRANSPORTABILITY OF A VEHICLE".

Base frame 210 further includes a rear upper frame 270 including a first longitudinal frame member 272A and a second longitudinal frame member 272B. Longitudinal frame members 272A and 272B support rear platform 150. Longitudinal frame members 272A and 272B are connected through cross members 274, 276, and 278.

Rear upper frame 270 is coupled to lower frame 212 through upwardly-extending frame members 280A, 280B, 282A, and 282B. Frame members 284A and 284B are provided to assist in maintaining the orientation of frame members 280A and 280B relative to frame members 214A and 214B.

Figure 11B:
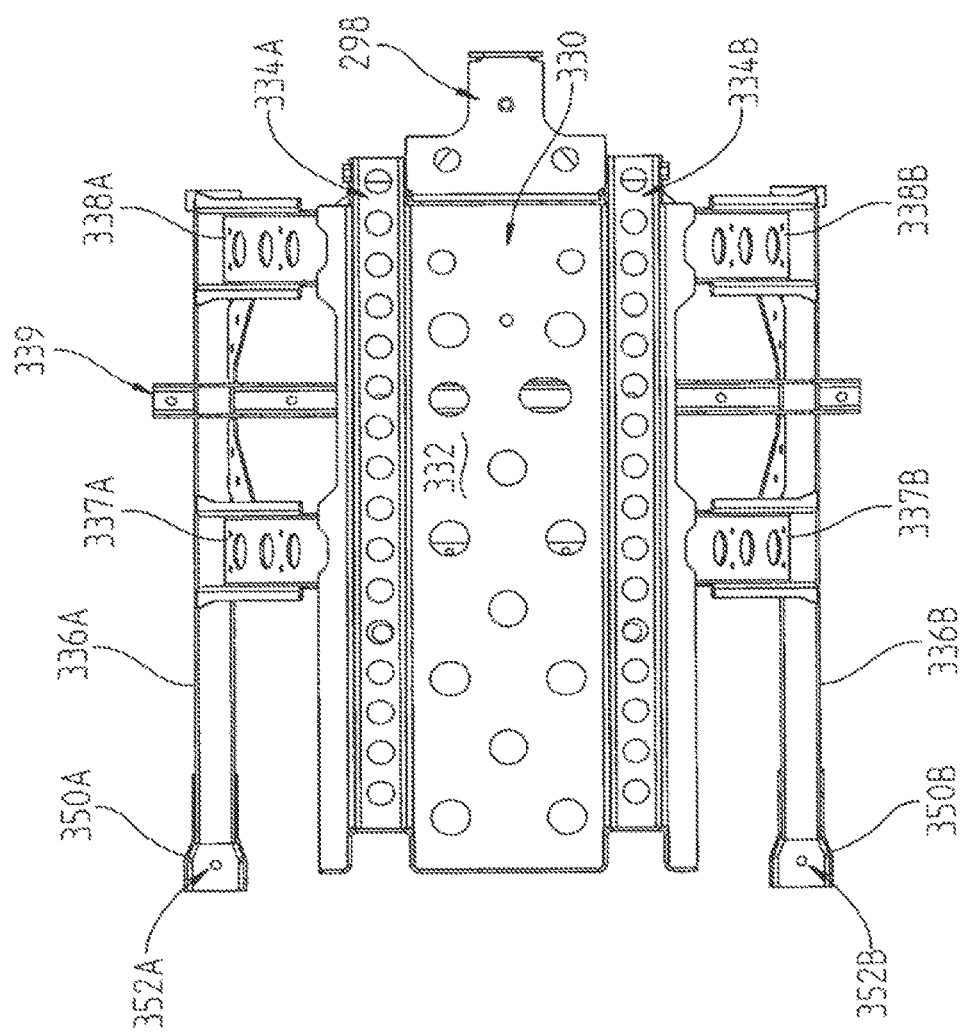
FIG. 11B is a bottom view of a modular frame assembly of the modular sub-section of FIG. 8A.
Figure 13A:
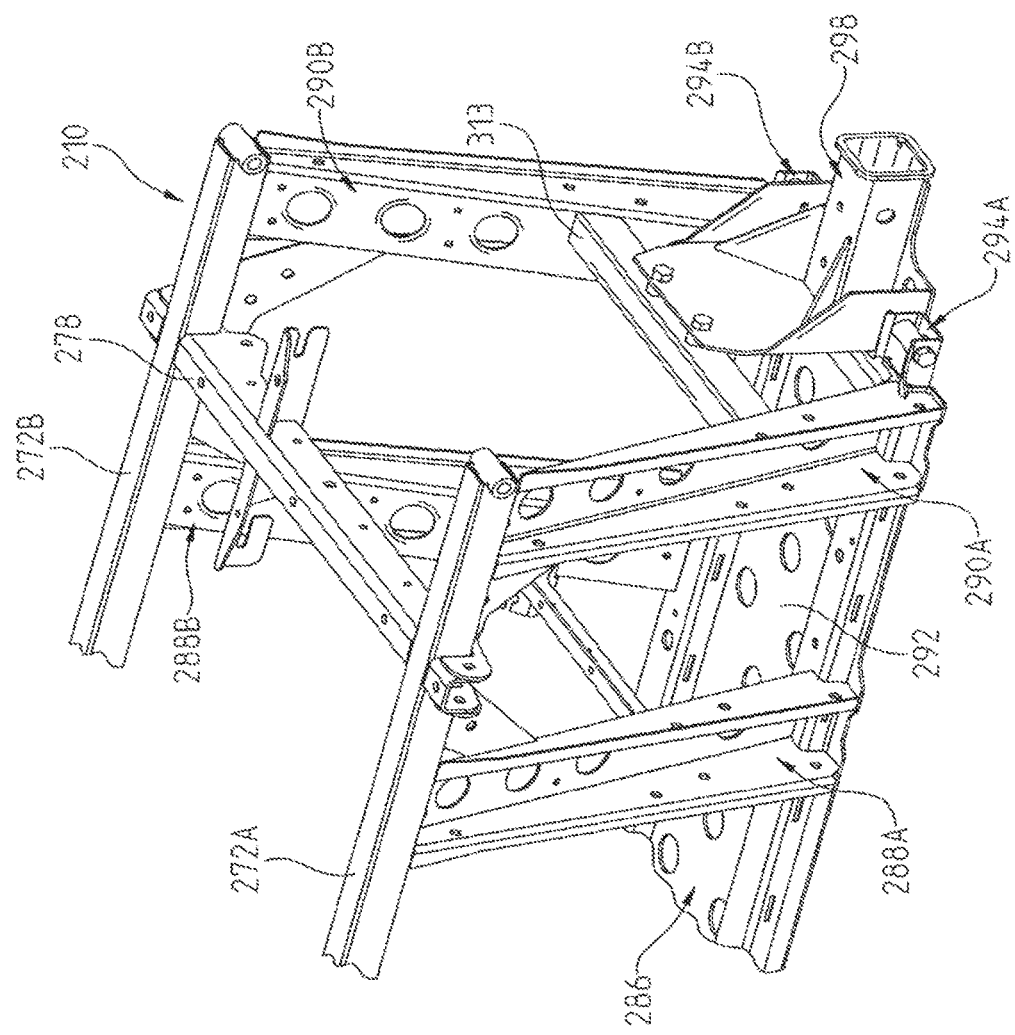
FIG. 13A is a partial, perspective view of the base frame of FIG. 9 with the receiver hitch of FIG. 12 coupled thereto.

Base frame 210 further includes a rear skid plate 286. Referring to FIGS. 11A and 13A, skid plate 286 is coupled to rear upper frame 270 through a plurality of upwardly-extending frame members 288A, 288B, 290A, and 290B. In one embodiment, frame members 288A, 288B, 290A, and 290B directly couple to rear platform 150 as described in U.S. Provisional Application Ser. No. 60/918,356, filed Mar. 16, 2007, titled "UTILITY VEHICLE HAVING MODULAR COMPONENTS".

Skid plate 286 includes a base member 292 and two U-shaped frame members 294A and 294B. Frame members 294A and 294B are received in recesses 296A and 296B of base member 292. Frame members 294A and 294B are coupled to base member 292. In one embodiment, frame members 294A and 294B are welded to base member 292. Each of the members of base frame 210 are coupled to the respective adjacent components of base frame 210. Exemplary types of coupling include welding and fasteners, such as bolts.

As explained in more detail herein, in one embodiment, a receiver hitch 298 is coupled to base frame 210 (shown in FIG. 13A). Further, as explained in more detail herein, in one embodiment, rear skid plate 286 and upper frame members 272A and 272B couple to a modular frame assembly 300 of modular sub-section 112 (shown in FIG. 14) thereby coupling modular sub-section 112 to base portion 200. Conveniently, apertures 322 and 326, in frame members 294A and 294B, respectively, may be used to couple either modular frame assembly 300 or receiver hitch 298.

Figure 12:
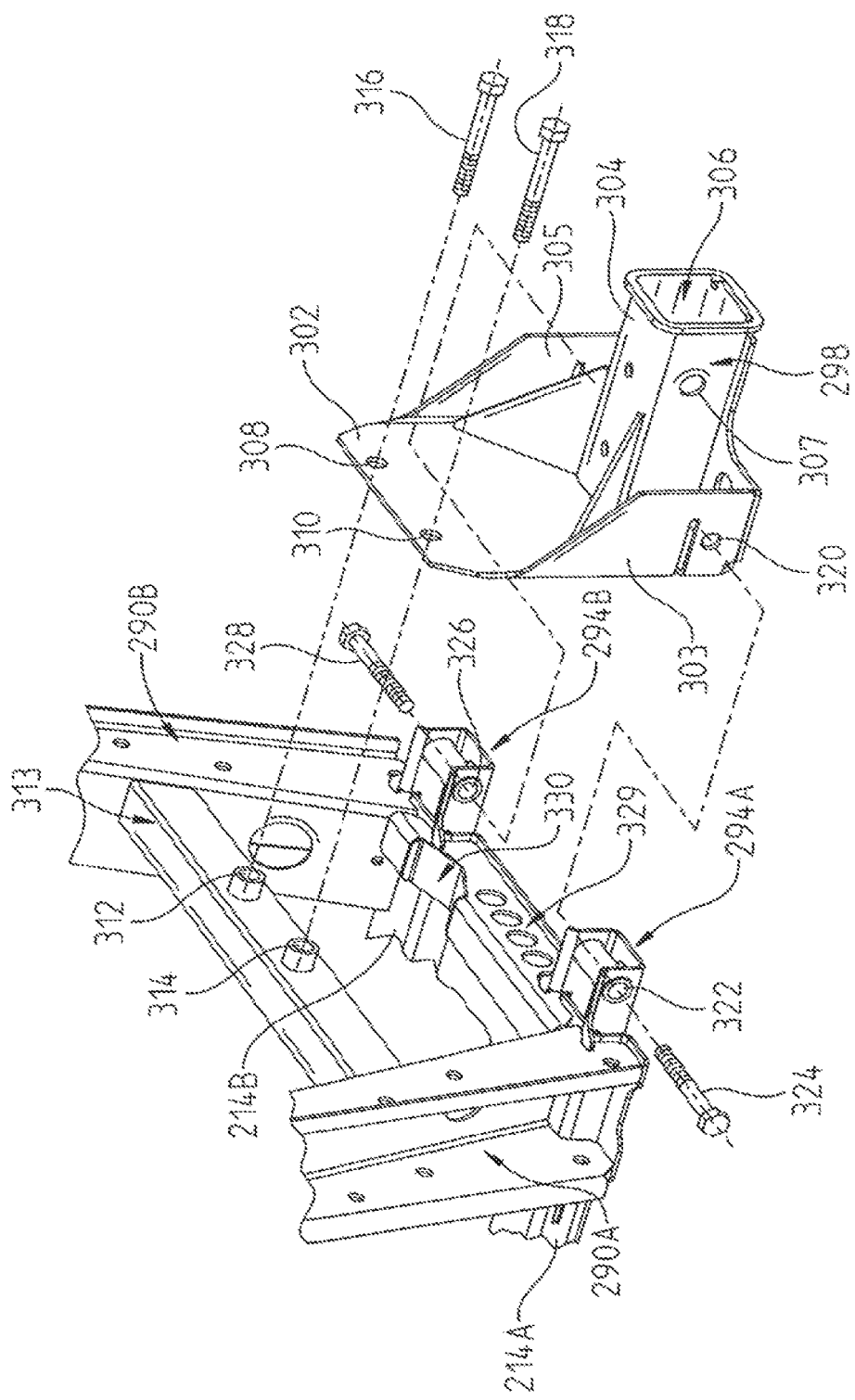
FIG. 12 is an exploded, perspective view of a portion of the base frame of FIG. 9 and a receiver hitch spaced apart therefrom.
Figure 13B:
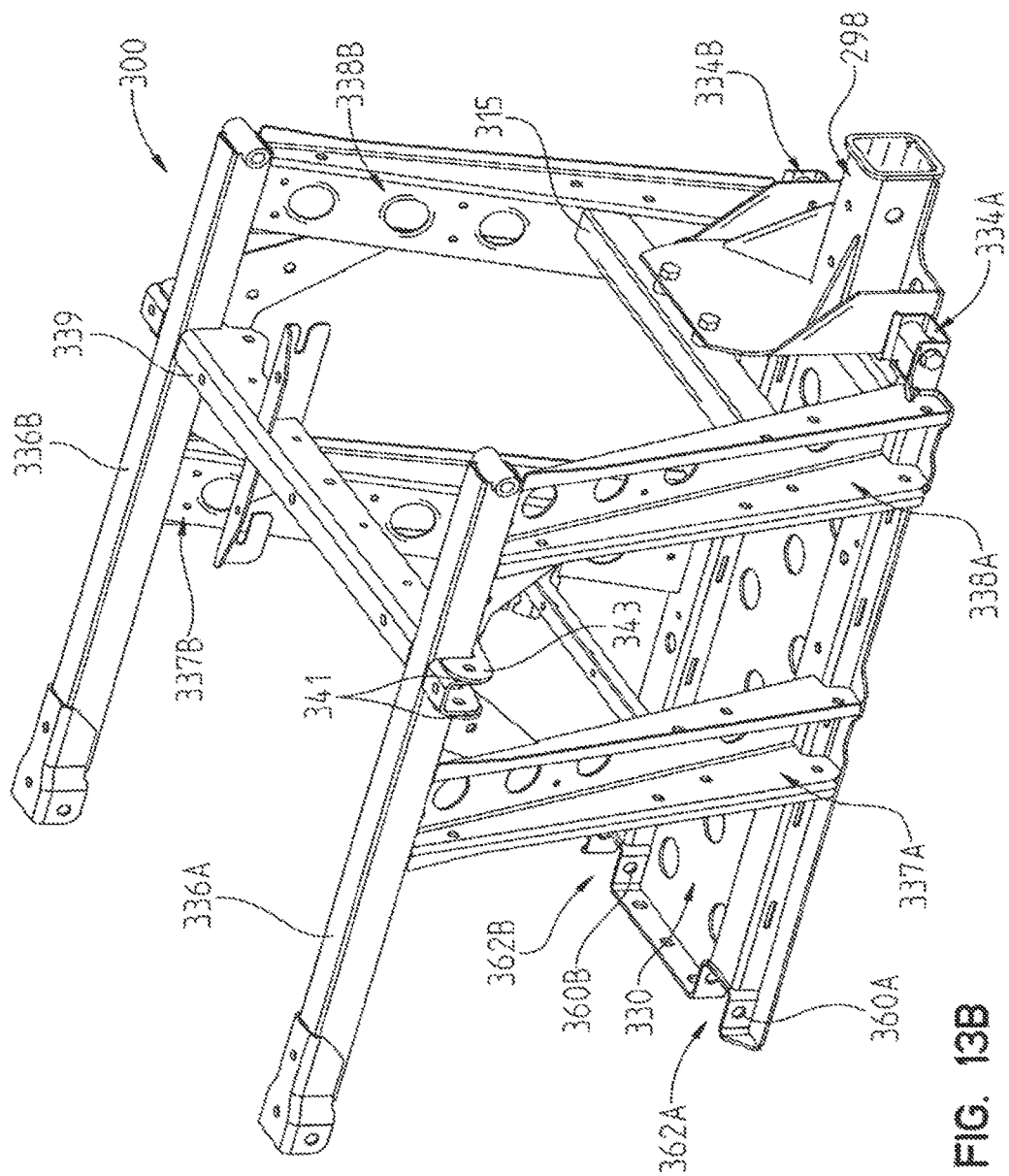
FIG. 13B is a perspective view of the modular frame assembly of modular sub-section of FIG. 11B with the receiver hitch of FIG. 12 coupled thereto.

Referring to FIGS. 12, 13A and 13B, receiver hitch 298 is shown. As shown in FIG. 13A, receiver hitch 298 is coupled to frame members 294A and 294B of skid plate 286 and to a cross frame member 313 spanning between frame members 290A and 290B. As shown in FIG. 13B, receiver hitch 298 is coupled to frame members 334A and 334B of skid plate 330 and to a cross frame member 315 spanning between frame members 338A and 338B.

As shown in FIG. 12, receiver hitch 298 includes a base member 302 and a receiver member 304. Base member 302 includes apertures 308 and 310 in base member 302 and apertures 320 on side wall 303 and a corresponding aperture on side wall 305, respectively. Receiver member 304 includes a recess 306 sized to receive a hitch or other component which may be secured through a fastener passing through aperture 307 of receiver member 304.

Bolts 316 and 318 are received in apertures 308 and 310 of base member 302 and then by apertures 312 and 314, respectively, of cross member 313. Bolts 316 and 318 (and the other bolts discussed herein) are either threaded into mating threads of apertures 312 and 314 (corresponding apertures for other bolts discussed herein) or have corresponding nuts that are tightened. Bolts 324 and 328 are received in apertures 320 and (not shown) in side walls 303 and 305, respectively, and then by apertures 322 and 326 in frame members 294A and 294B, respectively.

Receiver hitch 298 is shown assembled to base frame 210 in FIG. 13. In one embodiment, receiver hitch 298 is disassembled from base frame 210 prior to the attachment of modular sub-section 112 to base frame 210. As explained herein, a rear portion 340 of modular sub-section 112 has the same attachment locations as base frame 210 such that receiver hitch 298 may be easily assembled to the rear of modular sub-section 112 thereby permitting vehicle 100 to still tow a trailer or other item through a hitch. Receiver hitch 298 is shown assembled to modular sub-section 112 in FIG. 13B. In one embodiment, receiver hitch 298 remains assembled to base frame 210 prior to the attachment of modular sub-section 112 to base frame 210 and in one example (see FIG. 15) provides an additional connection point between base frame 210 and modular sub-section 112. Alternatively, the additional connection point between base frame 210 and modular sub-section 112 provided by receiver hitch 298 may replace one or both of the connections between skid plate 330 and frame members 294A and 294B.

Figure 7:
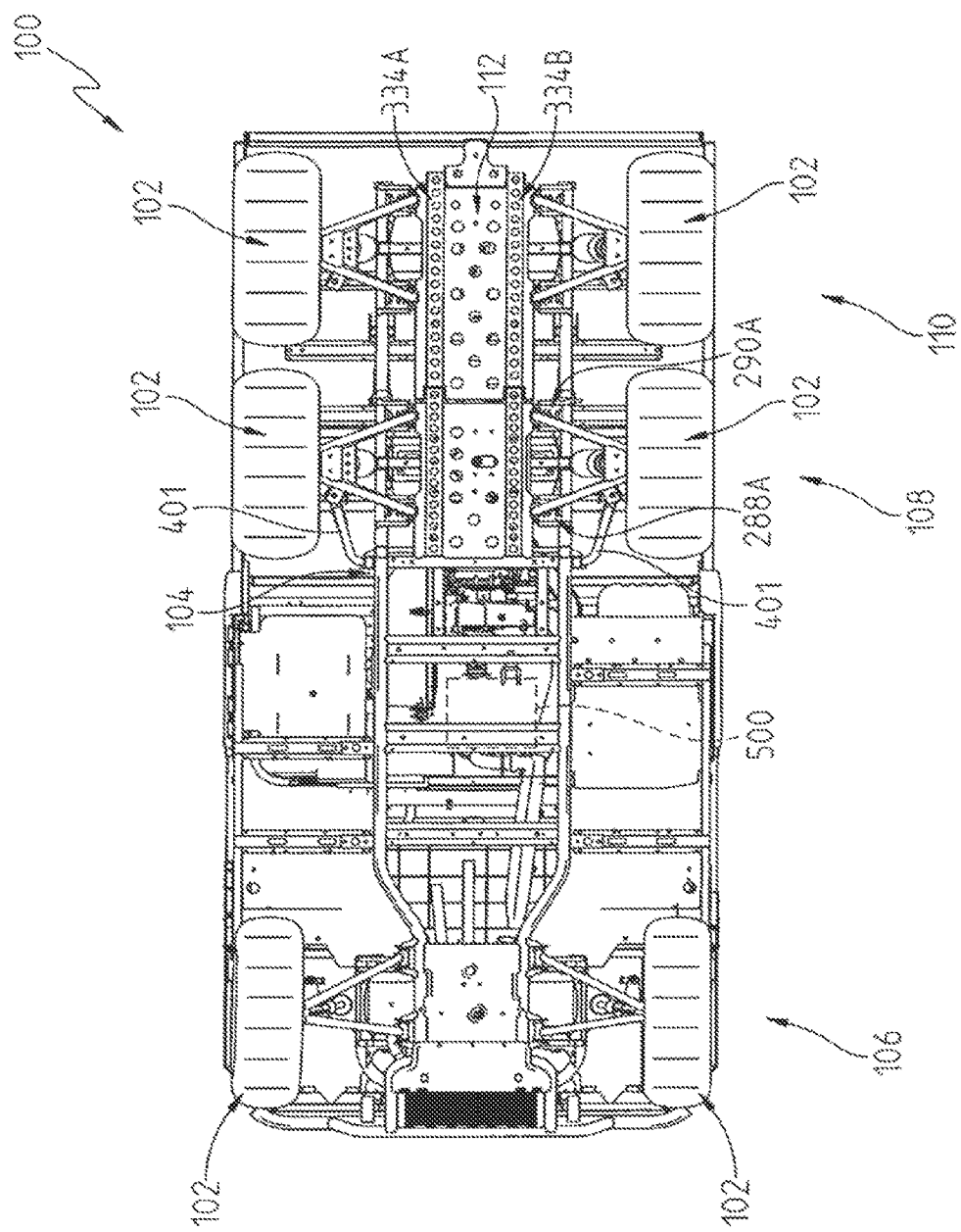
FIG. 7 is a bottom view of the vehicle FIG. 1.

Referring to FIG. 8A, modular sub-section 112 includes a modular frame assembly 300. Modular frame assembly 300 includes a skid plate 330 which is generally identical to skid plate 286. Skid plate 330 includes a base member 332 and two u-shaped members 334A and 334B (see FIG. 7). Modular frame assembly 300 includes two upper frame members 336A and 336B which are attached to skid plate 330 through frame members 337A and 337B and 338A and 338B. Frame members 336A, 336B, 337A, 337B, 338A, and 338B are generally identical to frame members 272A, 272B, 288A, 288B, 290A, and 290B of base frame 210, respectively. A cross member 339 of modular sub-section 112 is generally identical to cross member 278 of base frame 210. As stated herein, one or more of such modular sub-sections may not include a drive unit, such as a modular differential 524. As such, in one embodiment, a given axle may be non-powered and located between two powered axles or adjacent a powered axle and a non-powered axle.

As shown in FIG. 13B, cross member 339 includes a thickened portion 341 formed by coupling gussets 343 to cross member 339. The thickened portion 341 provides additional strength to cross member 339 which as discussed herein provides the upper mount for suspension systems 450A and 450B. A similar thickened portion is included on cross member 278 of base frame 210.

Rear portion 340 of modular sub-section 112 is generally identical to a rear portion 342 of base frame 210 and a front portion 344 of modular sub-section is configured to be coupled to rear portion 342 of base frame 210. Since rear portion 340 is generally identical to rear portion 342, a second modular sub-section 112 may be assembled to rear portion 340 of the first modular sub-section. Still further a third modular sub-section 112 may be assembled to rear portion 340 of the second modular sub-section and so forth thereby creating an 8×8 vehicle, a 10×10 vehicle, and so forth.

Figure 14:
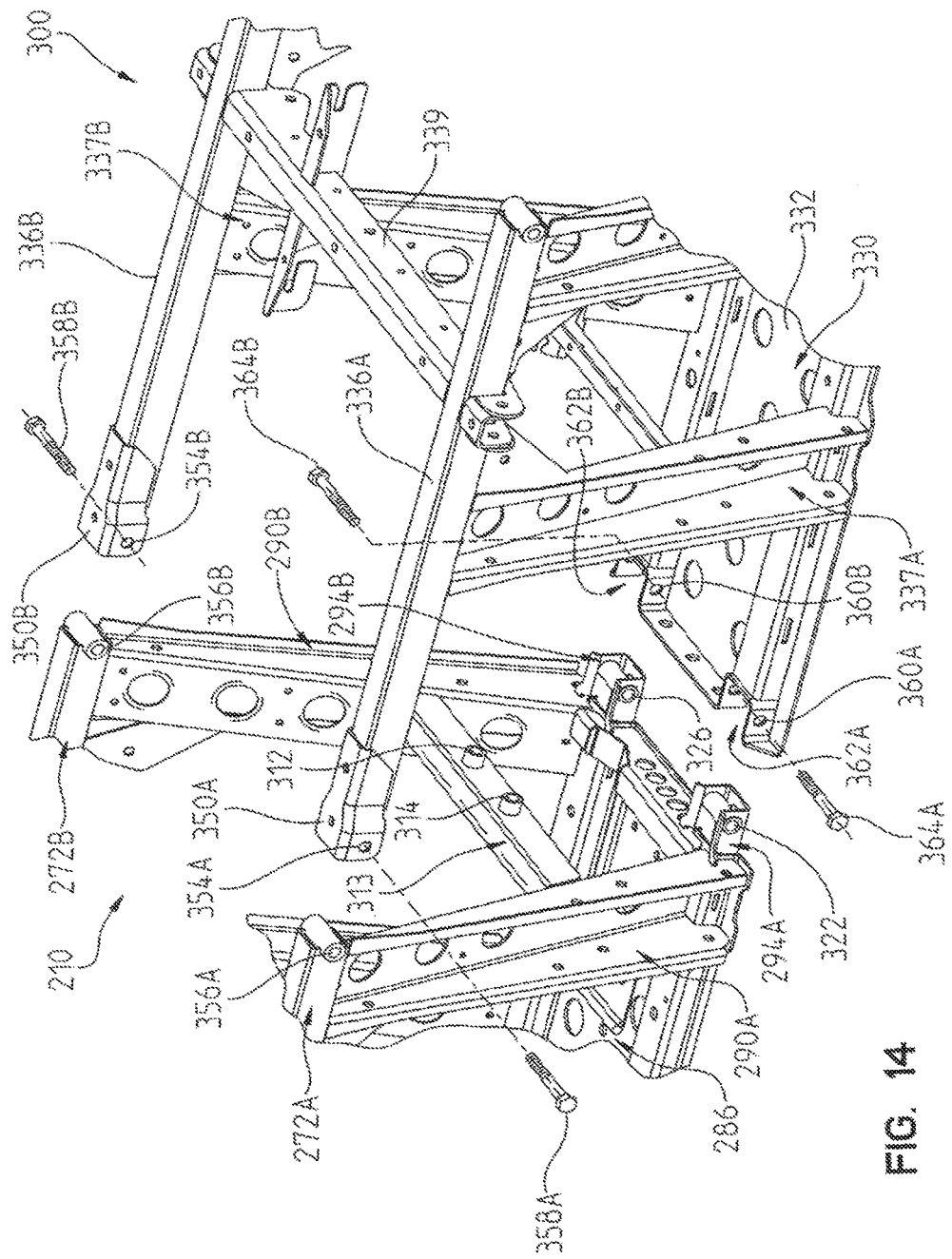
FIG. 14 is a partial perspective view of the base frame of FIG. 9 and the modular frame assembly of modular sub-section of FIG. 11B illustrating the frame connections between the two.

Referring to FIG. 14, the frame connections between rear portion 342 of base frame 210 and front portion 344 of modular sub-section 112 are shown. Receiver hitch 298 is disassembled from base frame 210 prior to the assembly of modular frame assembly 300. Upper frame members 336A and 336B each have coupled thereto a u-shaped receiver 350A and 350B. Receivers 350A and 350B each include a recess 352A and 352B (see FIG. 11B). Receivers 350A and 350B each further include apertures 354A and 354B which align with apertures 356A and 356B in base frame 210 to receive bolts 358A and 358B.

Skid plate 330 of modular base frame 300 includes apertures 360A and 360B which are formed on side walls of recesses 362A and 362B, respectively. Recesses 362A and 362B are sized to receive frame members 294A and 294B, respectively. Frame members 294A and 294B are advanced into recesses 362A and 362B until apertures 322 and 326 in frame members 294A and 294B are aligned with apertures 360A and 360B of modular base frame 300, respectively. Bolts 364A and 364B couple skid plate 330 and frame members 294A and 294B together.

Figure 10:
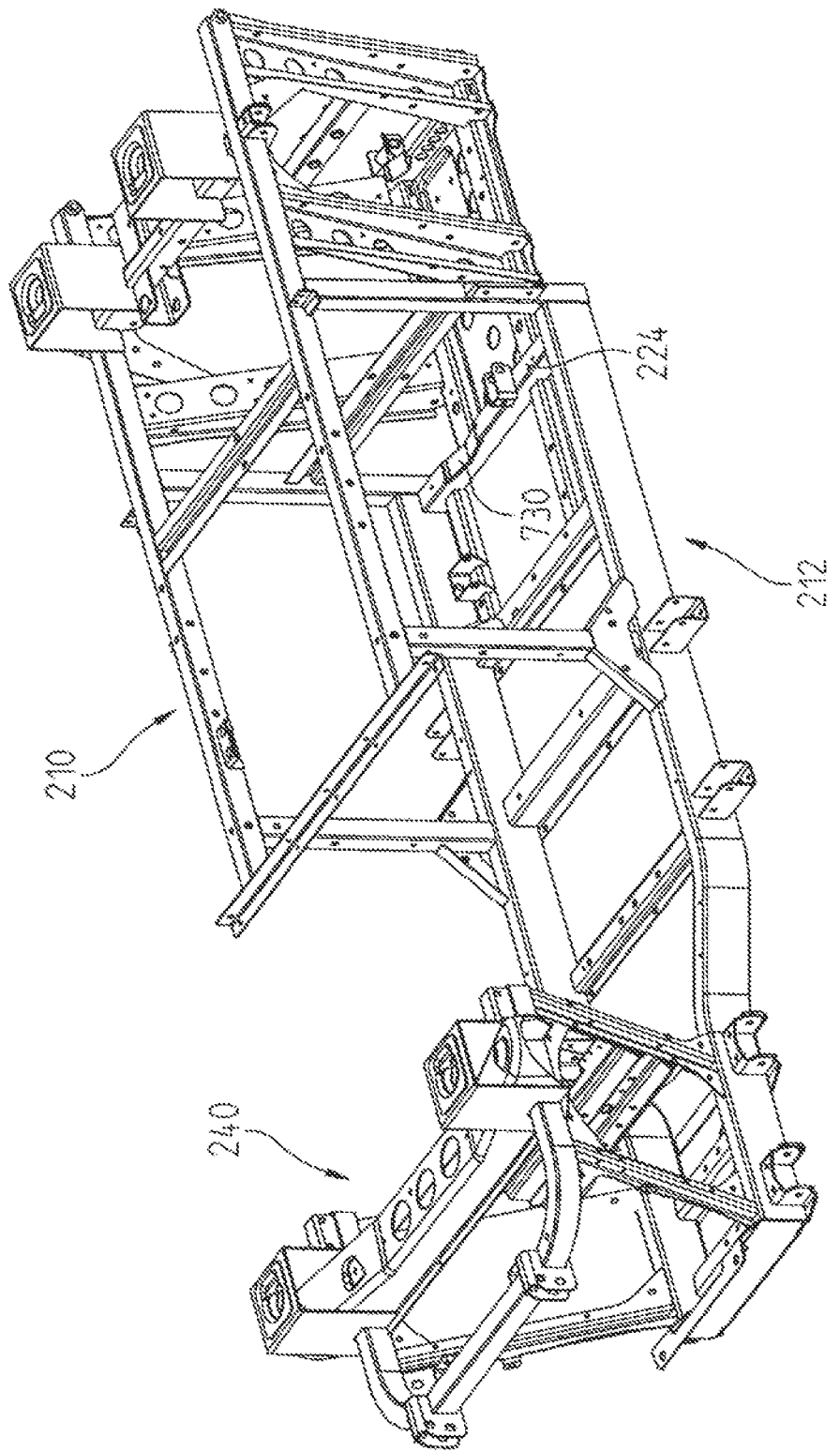
FIG. 10 is a second perspective view of the base frame of FIG. 9.

Although the above discussion is related to the assembly of modular frame assembly 300 to base frame 210, it should be understood that it is contemplated to couple a complete modular subsection 112 (such as shown in FIG. 10) to a complete base portion 200 (such as shown in FIG. 10). Therefore, a complete modular section 112 may be added or removed to base portion 200 through four frame connections. Although not shown in FIG. 10, it is contemplated, in one embodiment, that each of base portion 200 and modular subsection 112 include a rear platform 150. Additional details regarding exemplary rear platforms are provided in U.S. Provisional Application Ser. No. 60/918,356, filed Mar. 16, 2007, titled "UTILITY VEHICLE HAVING MODULAR COMPONENTS".

Modular frame assembly 300 may be assembled to base frame 210 in the following manner. Receivers 350A and 350B are placed on top of upper frame members 272A and 272B of base frame 210. Apertures 354A and 354B of receivers 350A and 350B are aligned with apertures 356A and 356B of upper frame members 272A and 272B, respectively. Bolts 358A and 358B are passed through the respective apertures and secured to the assembly. Modular frame assembly 300 is then rotated downward and frame members 294A and 294B are further advanced into recesses 362A and 362B until apertures 360A and 322 and apertures 360B and 326 are aligned. Bolts 364A and 364B are passed through the respective apertures and secured to the assembly completing the assembly of modular frame assembly 300 to base frame 210.

In one embodiment, in addition to the frame connections, an additional connection is made through drive shaft 523 and an electrical harness connected to differential 522. In one embodiment, drive shaft 523 is coupled to one of differential 520 and 522 through a spline coupling. As such, when modular subsection 112 is spaced apart from base portion 200, the spline coupling disconnects. The electrical harness connected to differential 522 includes a plug connection that may be disconnected to unhook modular subsection 112. The electrical harness connects differential 522 to ECM 510 which electronically configures differential 522 in either a locked configuration relative to output shaft 534A and 534B or an unlocked configuration relative to output shaft 534A and 534B. In one embodiment, when ECM 510 detects that parking brake 700 has been set, differential 520 and/or differential 522 are set to the locked configuration.

In one embodiment, rear platform 150 includes additional connections between base portion 200 and modular subsection 112 that need to be disconnected in order to separate modular subsection 112 from base portion 200. Additional details of exemplary rear platform connections are provided in U.S. Provisional Application Ser. No. 60/918,356, filed Mar. 16, 2007, titled "UTILITY VEHICLE HAVING MODULAR COMPONENTS".

Figure 15A:
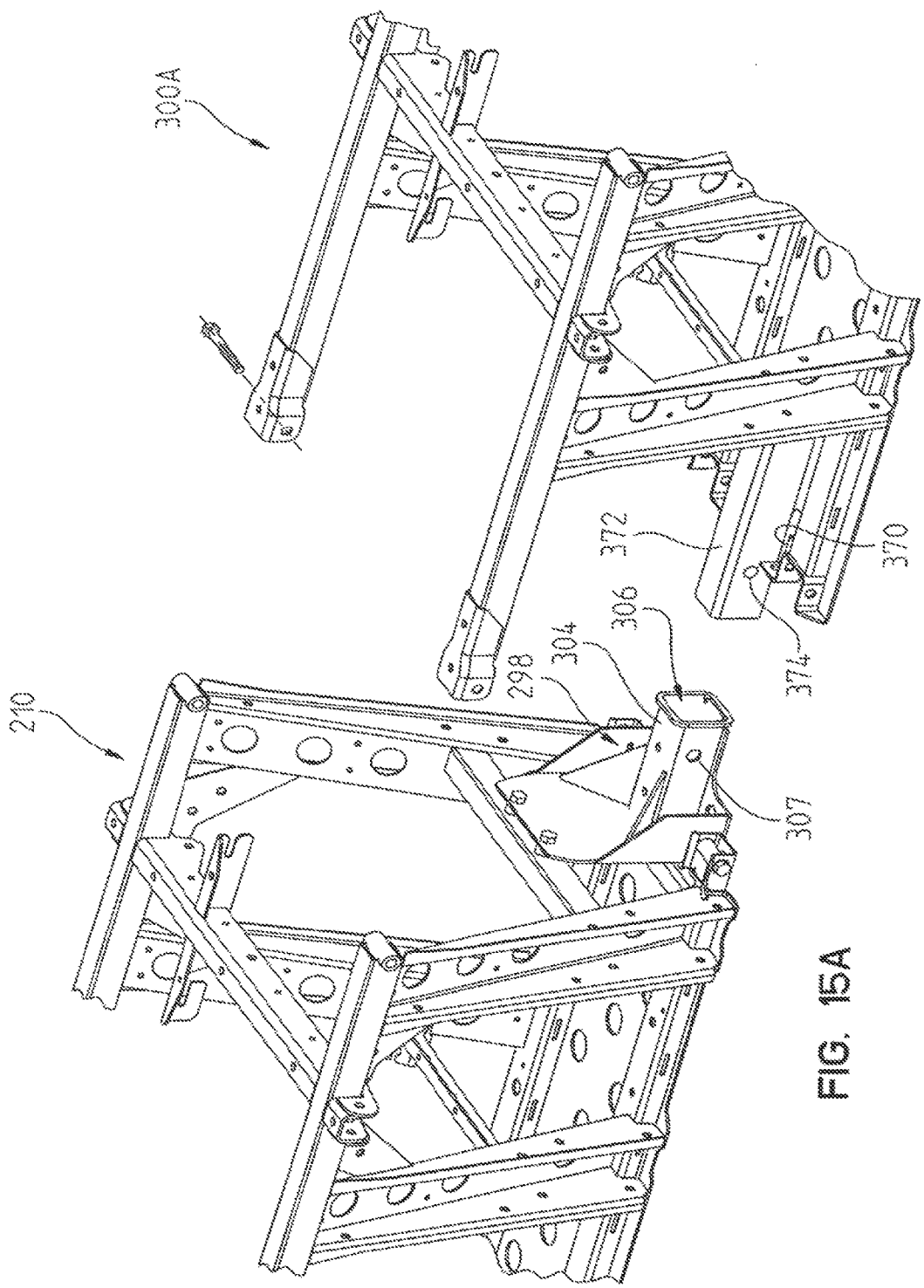
FIG. 15A is a partial perspective view of the base frame of FIG. 9 and the modular frame assembly of modular sub-section of FIG. 11B modified to illustrate the frame connections between the two including a connection by the receiver hitch coupled to the base frame of FIG. 9.

Referring to FIG. 15A, a second embodiment of the frame connections between base frame 210 having assembled thereto a receiver hitch 298 and a modified version of modular base frame 300'. Modular base frame 300' is generally identical to modular base frame 300 with the exception that skid plate 330' includes a recess 370 to receive portion 304 of receiver hitch 298 and a hitch member 372 is coupled to skid plate 330'. Hitch member 372 is received within recess 306 of receiver hitch 298. A bolt or pin is passed through aperture 307 of receiver hitch 298 and aperture 374 of hitch 372 to couple hitch member 372 to receiver hitch 298.

Figure 15B:
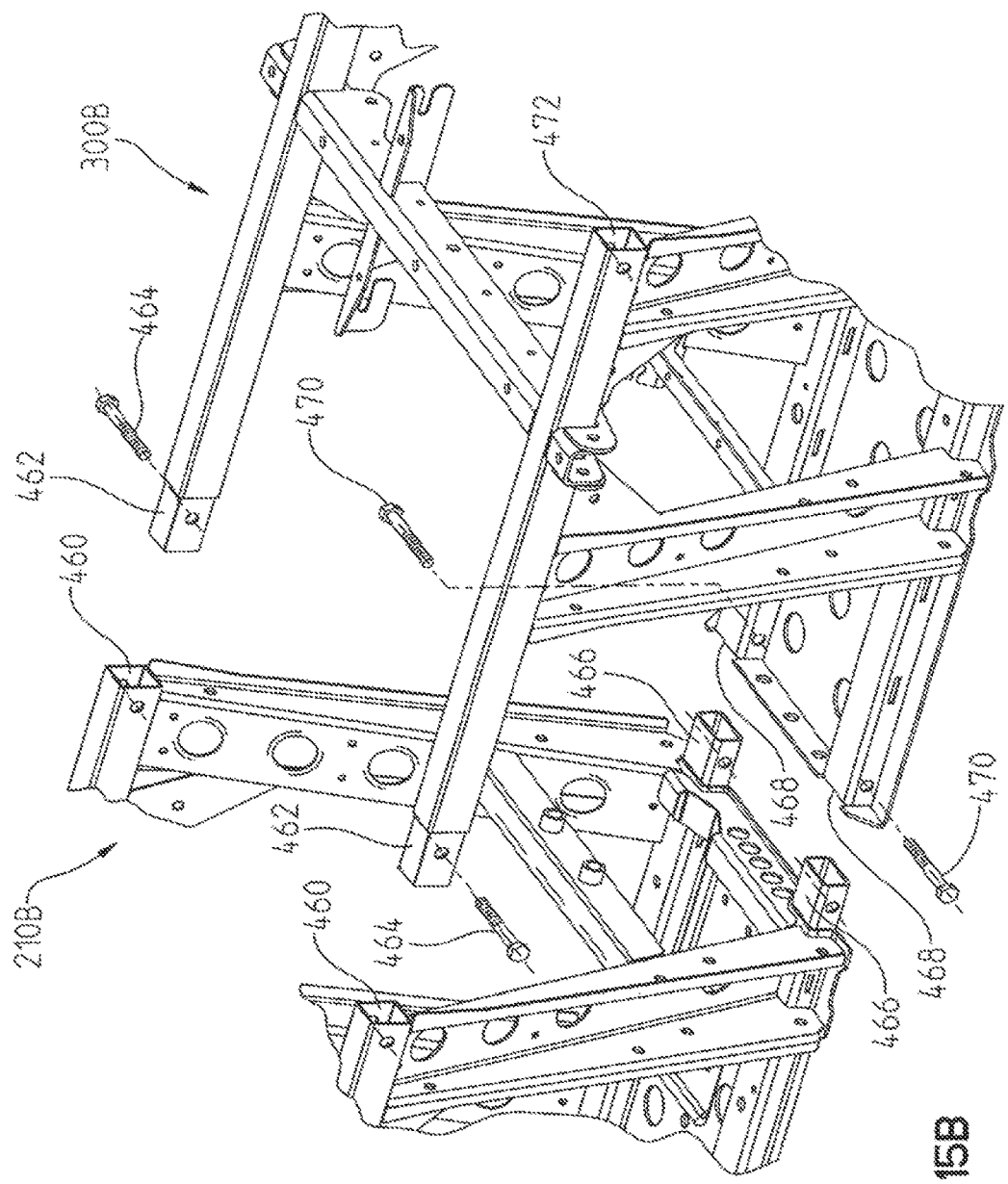
FIG. 15B is a partial perspective view of the base frame of FIG. 9 and the modular frame assembly of modular sub-section of FIG. 11B modified to illustrate another embodiment of the frame connections between the two.

Referring to FIG. 15B, an alternative embodiment is shown of the frame connections between a modified base frame 210 and a modified modular base frame 300. Base frame 210B and modular base frame 300B are generally identical to base frame 210 and modular base frame 300, respectively, except for the connectors that couple base frame 210B and modular base frame 300B. Receivers 350A and 350B and apertures 356A and 356B are replaced with male coupling portions 462 and receivers 460. Receivers 460 receive male coupling portions 462. Bolts 464 or pins are passed through apertures in male coupling portions 462 and the upper frame members which comprise receivers 460 to secure the upper two couplings. Similarly, receivers 468 receive male coupling portions 466. Bolts 470 or pins are passed through apertures in male coupling portions 466 and the frame members which comprise receivers 468 to secure the lower two couplings.

Figure 18:
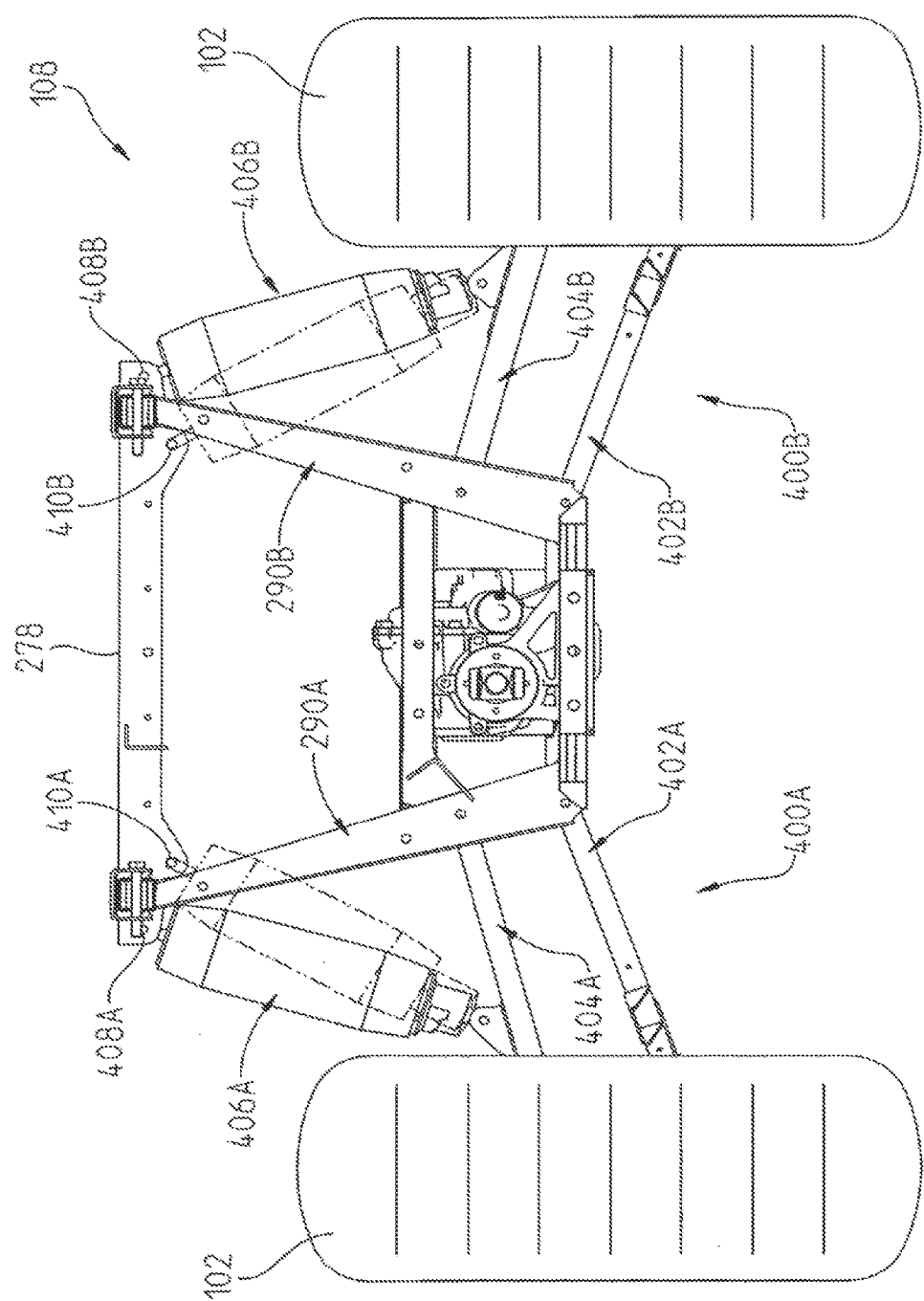
FIG. 18 is a rear view of the base frame of FIG. 9 and the location of shocks extending between a cross member of base frame and a suspension member.

Referring to FIG. 18, the wheels of mid axle 108 are coupled to base frame 210 through suspension systems 400A and 400B which are mirror images of each other. Suspension system 400A includes a lower A-frame member 402A and an upper A-frame member 404A, each connected to ground engaging member 102 and to frame members 288A and 290A (see FIG. 7). Suspension system 400A further includes a shock member 406A. Exemplary shock members 406A include springs and gas shocks.

Shock member 406A is coupled at a first end to frame member 404A of suspension system 400A and at a second end to frame member 278 of base frame 210. Each end of frame member 278 includes a first attachment location 408A and a second attachment location 410A inward relative to first attachment location 408A. Shock member 406A may be coupled to either first attachment location 408A or second attachment location 410A.

Shock member 406A is coupled to first attachment location 408A to provide a stiffer ride and more stability. By moving shock absorber to second attachment location 410A, suspension system 400A provides a softer ride. Suspension systems 400A and 400B are independent suspensions. In one embodiment, a torsion bar 401 (see FIG. 7) couples to base frame 210 and suspension systems 400A and 400B and generally couples the movement of suspension system 400A and suspension system 400B together.

Modular subsection 112 includes suspension systems 450A and 450B which are generally identical to suspensions 400A and 400B of base portion 200. As such, vehicle 100 in its base configuration is a four wheeled vehicle having four wheel independent suspension and in the configuration shown in FIG. 1 is a six wheeled vehicle having six wheel independent suspension.

By having suspensions 450A and 450B be identical to suspensions 400A and 400B, if a component of one of suspensions 400A or 400B fails, an operator of vehicle 100 may disconnect modular subsection 112 and use the corresponding component from one of suspensions 450A and 450B to replace the failed component of the respective suspension 400A and 400B. In a similar fashion ground engaging members 102 are identical and may be assembled at any location. As such, modular subsection 112 in addition to other features provides on demand spare components for base portion 200.

Referring to FIG. 2, base frame 210 and/or modular frame 300 are configured such that axle 110 carries less of the weight distribution than axle 108. In one embodiment, axle 108 carries about 65% of the weight plus or minus about 20%.

Figure 19:
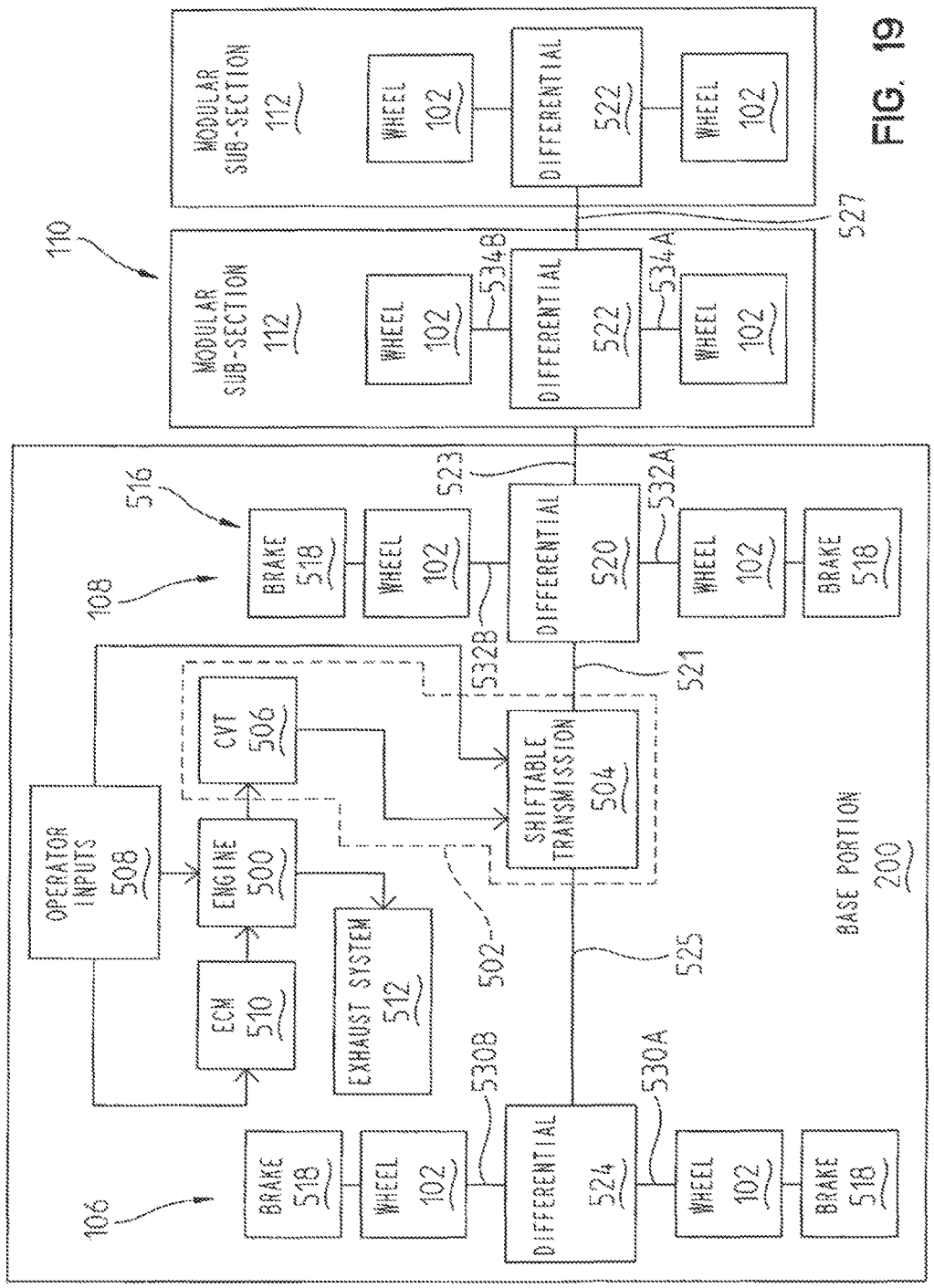
FIG. 19 is a diagrammatic representation of vehicle 100.

As mentioned earlier base portion 200 includes the components for a functional four by four vehicle. Referring to FIG. 19, base portion 200 includes an engine 500 to power base portion 200 and a transmission 502 coupled to engine 500. In one embodiment, engine 500 is a multifuel engine capable of utilizing various fuels. Exemplary engines are disclosed in U.S. patent application Ser. No. 11/445,731, filed Jun. 2, 2006, the disclosure of which is expressly incorporated by reference herein. In one embodiment, engine 500 is a hybrid electric engine. In one embodiment, engine 500 is a hybrid electric drive engine.

In one embodiment, transmission 502 includes a shiftable transmission 504 and a continuously variable transmission ("CVT") 506. CVT 506 is coupled to engine 500 and shiftable transmission 504. Shiftable transmission 504 is coupled to drive shaft 525 coupled to front differential 524 and to drive shaft 521 coupled to rear differential 520.

Shiftable transmission 504 is shiftable between a high gear for normal forward driving, a low gear for towing, a reverse gear for driving in reverse, and a park setting which locks the output drive of the shiftable transmission from rotating. Exemplary shiftable transmissions and CVTs are disclosed in U.S. Pat. No. 6,725,962 and U.S. Pat. No. 6,978,857, the disclosures of which are expressly incorporated by reference herein.

Figure 16A:
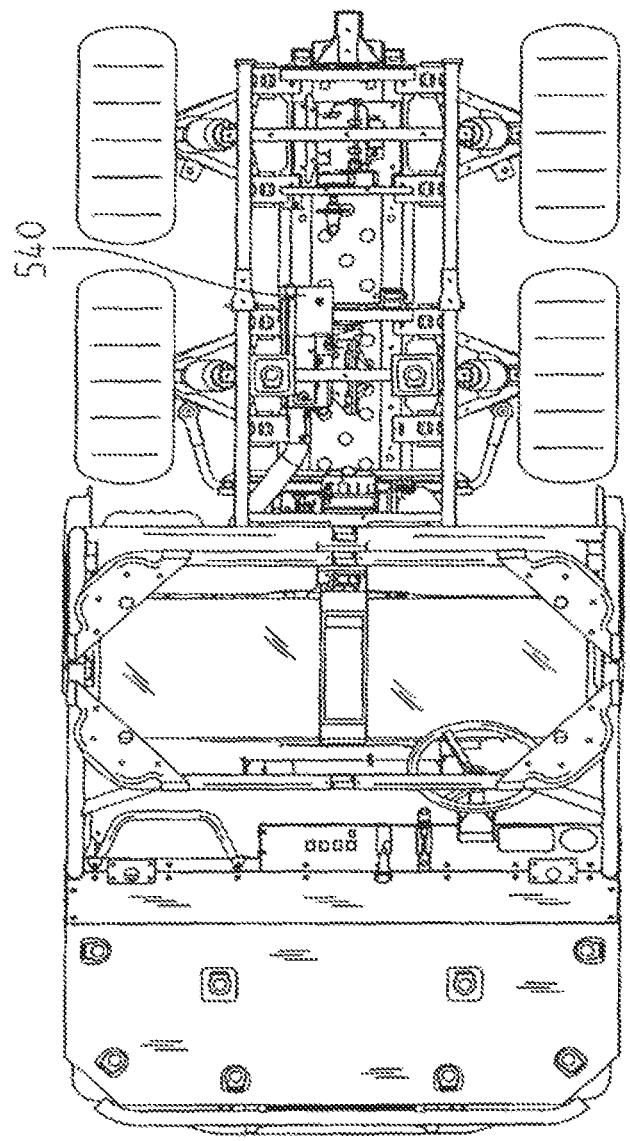
FIG. 16A is a top view of vehicle 100 without the rear platform illustrating the location of the exhaust.

The operation of engine 500 and transmission 502 are controlled through one or both of operator inputs 508 (such as controls 120) and an electrical control module 510 ("ECM") having software to control the operation of engine 500 based on operator inputs 508 and sensors which monitor engine 500 and software to control the operation of differentials 520, 522, and 524. Engine 500 is connected to air intakes and an exhaust system 512. Additional details regarding exemplary air intakes are provided in U.S. Provisional Application Ser. No. 60/918,556, filed Mar. 16, 2007, titled "VEHICLE". In one embodiment, as shown in FIG. 16A, exhaust system 512 includes a muffler 540 which is coupled to base frame 210. FIG. 16B shows the same vehicle with muffler 540 removed and drive shaft 523 added.

Transmission 502 is coupled to main (or intermediate) differential 520 and a front differential 524 through drive shafts 521 and 525, respectively. Drive shafts 521 and 525, like other drive shafts mentioned herein, may include multiple components and are not limited to straight shafts. Front differential 524 includes two output shafts 530A and 530B, each coupling a respective ground engaging member 102 of axle 106 to front differential 524. Intermediate differential 520 includes two output shafts 532A and 532B, each coupling a respective ground engaging member 102 of axle 108 to differential 520. Intermediate differential 520 is connected to a rear differential 522 of modular subsection 112 through drive shaft 523. Differential 522 of first modular sub-section 112 is connected to second modular subsection 112 through drive shaft 527. Differential 522 includes two output shafts 534A and 534B, each coupling a respective ground engaging member 102 of axle 110 to differential 522. As such, the ground engaging members 102 of modular subsections 112 are coupled to rear differential 520 through modular section differential 522 and drive shaft 523 coupling rear differential 520 and modular section differential 522.

Various configurations of front differential 524, rear differential 520, and modular differential 522 are contemplated. Regarding front differential 524, in one embodiment front differential 524 has a first configuration wherein power is provided to both of the wheels of front axle 106 and a second configuration wherein power is provided to one of the wheels of axle 106, such as the wheel having the less resistance relative to the ground.

In one embodiment, front differential 524 includes active descent control ("ADC"). ADC is an all wheel drive system that provides on-demand torque transfer to the front wheels with a front drive and is also capable of providing engine braking torque to the front wheels with a back drive. Both the front drive and the back drive are portions of front differential 524 and may be active or inactive. In the case of the front drive, when active, power is provided to both of the wheels of front axle 106 and, when inactive, power is provided to one of the wheels of front axle 106. In the case of the back drive, when active, engine braking is provided to the wheels of front axle 106 and, when inactive, engine braking is not provided to the wheels of front axle 106.

The front drive aspect of front differential 524 is accomplished by the use of two bi-directional over running clutches located in a centralized front gearcase as explained in more detail in U.S. Pat. No. 5,036,939, the disclosure of which is expressly incorporated by reference herein. The engine braking aspect of the back drive of front differential 524 is accomplished by coupling clutch packs between each of the front driving wheels and the front gearcase, such that the clutch packs are selectively engaged when specific vehicle requirements are met. In one embodiment, the specific vehicle requirements are an operator input 508 is switched to an "On" position, (see U.S. Provisional Application Ser. No. 60/918,556, filed Mar. 16, 2007, titled "VEHICLE", and/or U.S. Provisional Application Ser. No. 60/918,444, filed Mar. 16, 2007, titled "VEHICLE WITH SPACE UTILIZATION", for location of switch in operator cab 114), the throttle of vehicle 100 is closed, and the speed of vehicle 100 is less than about 15 mph. If all of the desired conditions are met, the vehicle control module (ECM 510) powers an electromagnetic coil that drives a hydraulic pump to apply pressure to the clutch packs, thereby providing a dynamic coupling between the front wheels and the rest of the driveline.

Regarding rear differential 520, in one embodiment rear differential 520 is a locked differential wherein power is provided to both of the wheels of axle 108 through output shafts 532A and 532B and drive shaft 523 is a thru shaft which may be connected to modular differential 522 or used as a power takeoff. In one embodiment, rear differential 520 is a lockable/unlockable differential relative to output shafts 532A and 532B and drive shaft 523 is a thru shaft which may be connected to modular differential 522 or used as a power takeoff. When rear differential 520 is in a locked configuration power is provided to both wheels of axle 108 through output shafts 532A and 532B. When rear differential 520 is in an unlocked configuration, power is provided to one of the wheels of axle 108, such as the wheel having the less resistance relative to the ground, through output shafts 532A and 532B. In one embodiment, rear differential 520 is a lockable/unlockable differential relative to output shafts 532A and 532B and a lockable/unlockable differential relative to drive shaft 523. In a first configuration, rear differential 520 is locked relative to output shafts 532A and 532B (power is provided to both wheels of axle 108 through output shafts 532A and 532B) and unlocked relative to drive shaft 523 (power is not provided to drive shaft 523). In a second configuration, rear differential 520 is locked relative to output shafts 532A and 532B (power is provided to both wheels of axle 108 through output shafts 532A and 532B) and locked relative to drive shaft 523 (power is provided to drive shaft 523). In a third configuration, rear differential 520 is unlocked relative to output shafts 532A and 532B (power is provided to one of the wheels of axle 108, such as the wheel having the less resistance relative to the ground, through output shafts 532A and 532B) and unlocked relative to drive shaft 523 (power is not provided to drive shaft 523). In a fourth configuration, rear differential 520 is unlocked relative to output shafts 532A and 532B (power is provided to one of the wheels of axle 108, such as the wheel having the less resistance relative to the ground, through output shafts 532A and 532B) and locked relative to drive shaft 523 (power is provided to drive shaft 523).

In one embodiment, rear differential 520 does not include drive shaft 523. This may be in the case of when only a 4×4 vehicle is contemplated or a 6×6 vehicle without power to the third axle. In this case, rear differential 520 may be either a locked differential relative to output shafts 532A and 532B or a lockable/unlockable differential relative to output shafts 532A and 532B. In one embodiment, modular differential 522 does not include an output drive shaft 527. As such, a subsequent modular unit added to vehicle 100 would not be able to receive power by simply connecting to an output shaft of differential 522 of the first modular subsection 112. In this case, modular differential 522 may be either a locked differential relative to output shafts 534A and 534B or a lockable/unlockable differential relative to output shafts 534A and 534B.

Figure 17:
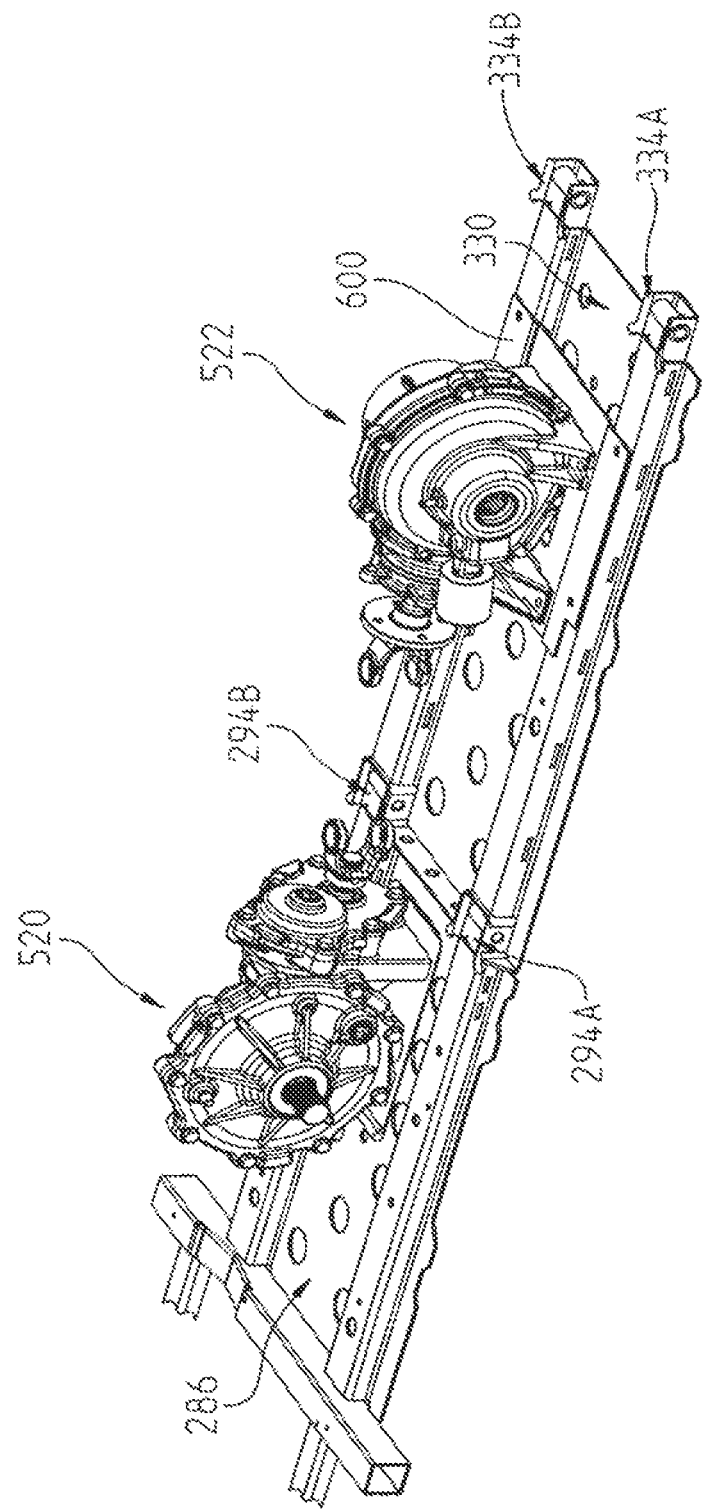
FIG. 17 illustrates a skid plate of the base frame of FIG. 9 and a skid plate of modular frame assembly of FIG. 11B, each supporting a respective drive unit.

Further, as explained herein relative to FIG. 17, modular differential 522 is mounted to a bracket 600 which may be decoupled from skid plate 330 and coupled to skid plate 286 to replace rear differential 520 if rear differential 520 fails. Both skid plate 330 and skid plate 286 have corresponding apertures to align with a mounting pattern of bracket 600. This is one example wherein the new rear differential 520 (old modular differential 522) does not include an output drive shaft other than to the respective wheels. Differential 522 is moved while mounted to bracket 600. It should be noted that in general the components of modular subsection 112 may be used to replace similar components on base portion 200 in case of failure. Such components include the differential, the wheels, and other suitable components. This interchangeability is beneficial when vehicle 100 is in remote and/or dangerous (such as a military campaign) environment.

However, in one embodiment as illustrated in FIG. 19, modular differential 522 includes an output drive shaft 527 similar to drive shaft 523 of rear differential 520. As such, a subsequent modular unit added to vehicle 100 would be able to receive power by simply connecting to output shaft 527 of differential 522 of the first modular subsection 112 or a power takeoff is provided at the rear of modular subsection 112. In this case, modular differential 522 may have any of the described configurations herein for rear differential 520 in the embodiments wherein rear differential 520 includes an drive shaft 523.

In one embodiment, either rear differential 520 or modular differential 522 are not included. In the case of rear differential 520 not being included drive shaft 521 extends to modular differential 522 and mid axle 108 is not powered. In one embodiment, wherein multiple modular subsections 112 are added, if one of the modular subsections does not include modular differential 522 then the wheels of that modular subsection are not powered. In one embodiment, front differential 524 is not included resulting in front axle 106 not being powered. In one embodiment, both rear differential 520 and modular differential 522 are not included resulting in both axle 108 and axle 110 not being powered.

Figure 21:
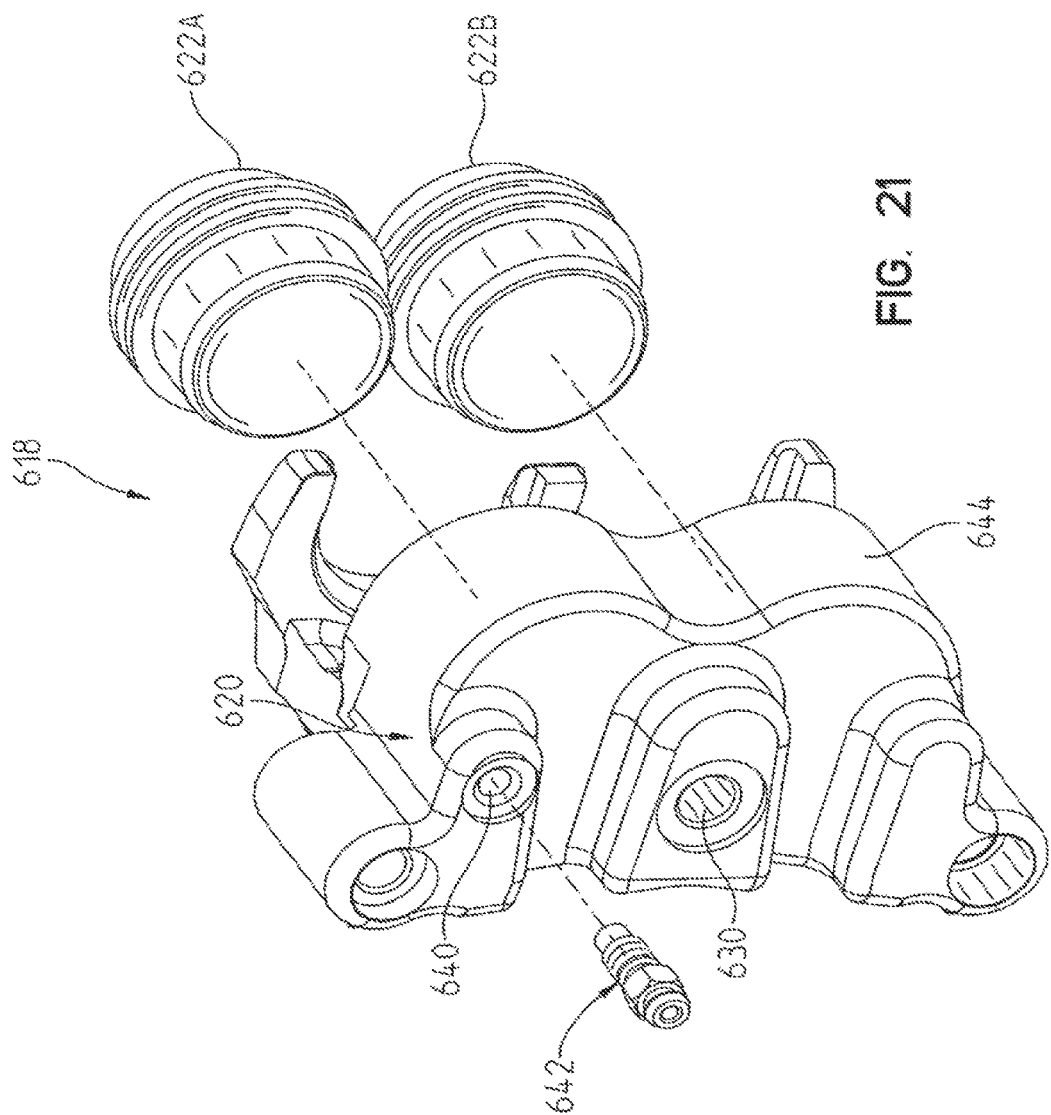
FIGS. 21-23 are an exemplary brake unit.
Figure 22:
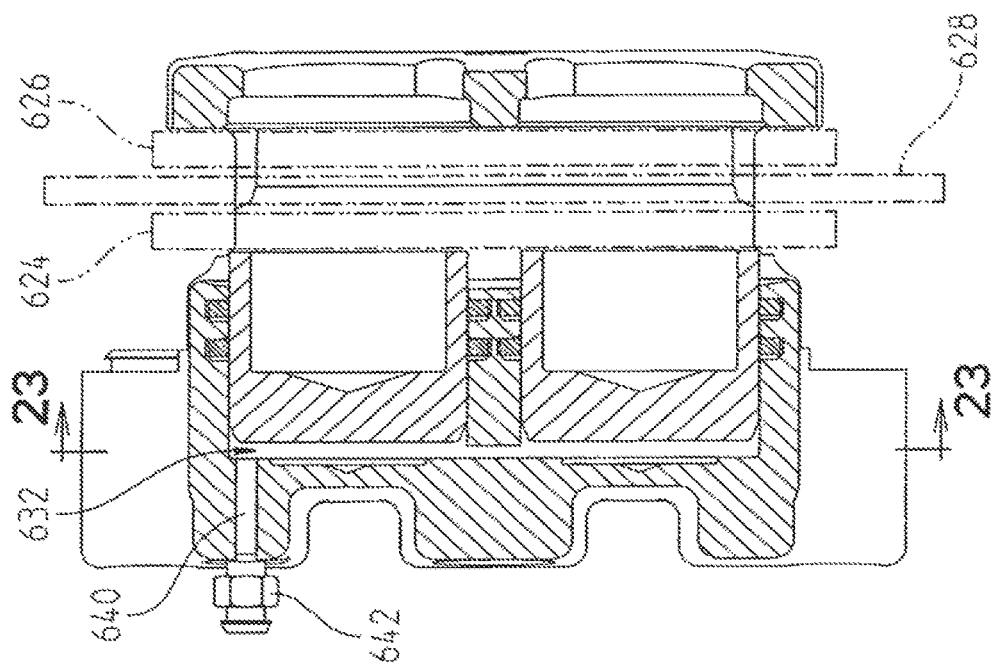
Figure 23:
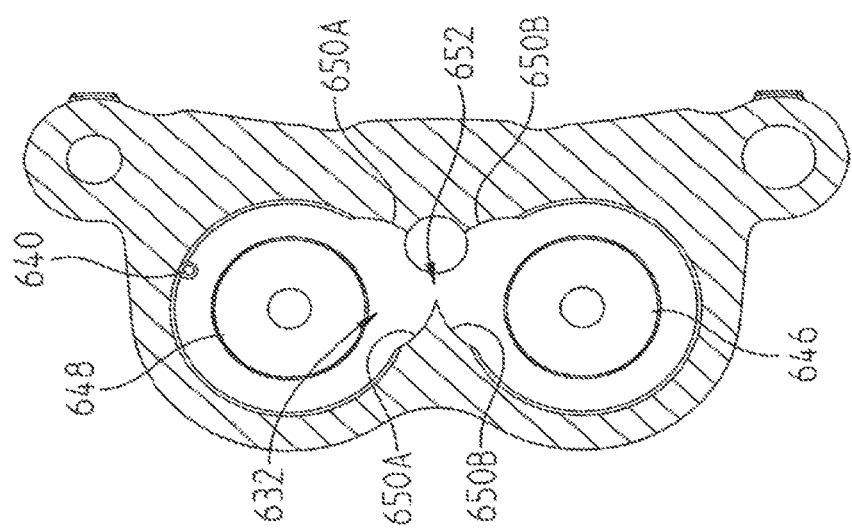

Base portion 200 further includes a braking system 516 including brake units 518 at each of the four wheels of base portion 200. In one embodiment, brake units are maintenance free brakes. Exemplary maintenance free brakes include wet brakes. In one embodiment, brake units 518 are disk brakes. In one embodiment, each disk brake includes multiple piston calipers (see FIG. 22) to provide increased braking force. Referring to FIGS. 21-23, a brake unit 618 is shown. Brake unit 618 includes a housing 620, two pistons 622A and 622B disposed within housing, a first brake pad 624 coupled to the two pistons 622A and 622B, and a second brake pad 626 spaced apart from the first brake pad 624. First brake pad 624 and second brake pad 626 are placed on opposite sides of a disk 628 that rotates with the respective wheel.

Brake fluid is introduced through inlet 630 to an area 632 on a first side of pistons 622A and 622B to move pistons 622A and 622B and hence move first brake pad 624 into contact with the disk 628 and the disk 628 into contact with second brake pad 626. Referring to FIG. 22, the area 632 in fluid communication with the first side of the pistons 622A and 622B is further in fluid communication with a bleed outlet 640. Bleed outlet 640 is in fluid communication with a bleed valve 642 on an exterior 644 of housing 620 (see FIG. 21). The shape of the area 632 behind the pistons 622A and 622B is selected such that air bubbles may move from a lower portion 646 of the area 630 to an upper portion 648 of the area 630 and out through bleed outlet 640 when bleed valve 642 is opened. In the illustrated embodiment, the area 632 includes two generally circular cuts 650A and 650B which form a passage 652 that connect a first piston chamber with a second piston chamber.

In one embodiment, drive shaft 523 of rear differential 520 is a thru shaft or is in a locked configuration when differential 520 is lockable/unlockable relative to output shafts 532A, 532B. When axle 108 is braked through braking units 518 drive shaft 523 is prevented from rotating thereby providing braking to axle 110 through the drive shaft.

Figure 24:
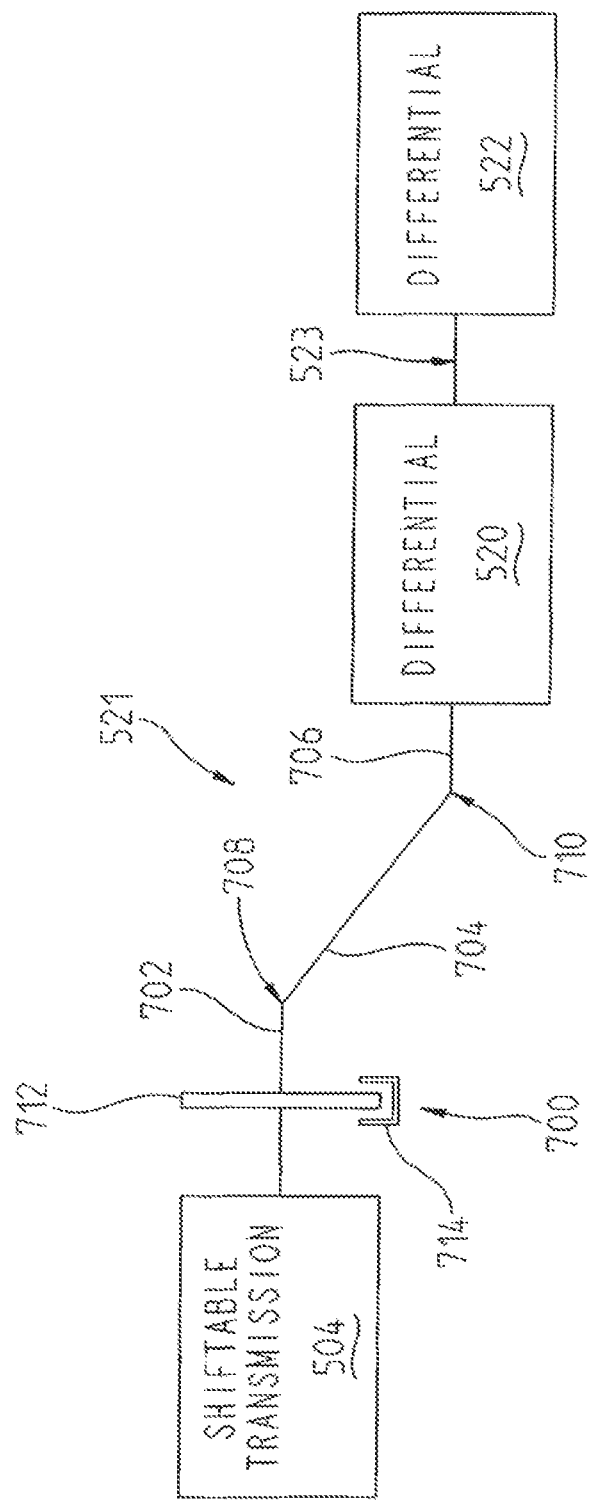
FIG. 24 is a diagrammatic representation of the location of a parking brake.

Referring to FIG. 24, a diagrammatic representation of the placement of a parking brake 700 is described. Shiftable transmission 504 is coupled to differential 520 through drive shaft 521 and differential 520 is coupled to differential 522 through drive shaft 523. In the illustrated embodiment, drive shaft 521 includes three components 702, 704, and 706 connected through two U-joints 708 and 710. Further, components 702, 704, and 706 are not axially aligned. By having a jointed drive shaft 521, differential 520 does not need to be placed at the same elevation as shiftable transmission 504 and/or laterally at the same location as shiftable transmission 504. In embodiment, drive shaft 521 is a single piece drive shaft.

Regarding parking brake 700, a disk 712 is coupled directly to drive shaft 521. Disk 712 interacts with a caliper 714 which limits the rotation of disk 712 to engage the parking brake 700. In the illustrated embodiment, disk 712 is coupled to portion 702 of drive shaft 521 that exits shiftable transmission 504 or is coupled to an output shaft of shiftable transmission 504. In one embodiment, parking brake 700 is located between shiftable transmission 504 and differential 520. In one embodiment, parking brake 700 is coupled to drive shaft 521 and is located on a first portion of drive shaft 521 between shiftable transmission 504 and a first joint 708 of drive shaft 521.

Referring to FIG. 25, an exemplary embodiment of parking brake 700 is shown. Parking brake disk 712 is coupled to a first portion 702 of drive shaft 521 having a clevis which forms a portion of U-joint 708. First portion 702 of drive shaft 521 is coupled to an output shaft 722 of shiftable transmission 504. Referring to FIG. 10, cross member 224 of frame 210 includes a recess 730 to accommodate disk 712 of parking brake 700.

In one embodiment, when the parking brake is applied ECM 510 limits the rpm of engine 500 to a lower level, such as below CVT engagement. In one embodiment ECM 510 receives an input from one of a switch on the parking brake 700 or a light associated with controls 120 or a speedometer that the parking brake is applied. By limiting the engine, an operator is prevented from driving off with the parking brake applied and subsequently causing damage to the pads of the parking brake and/or a drive belt of the CVT.

Figure 26A:
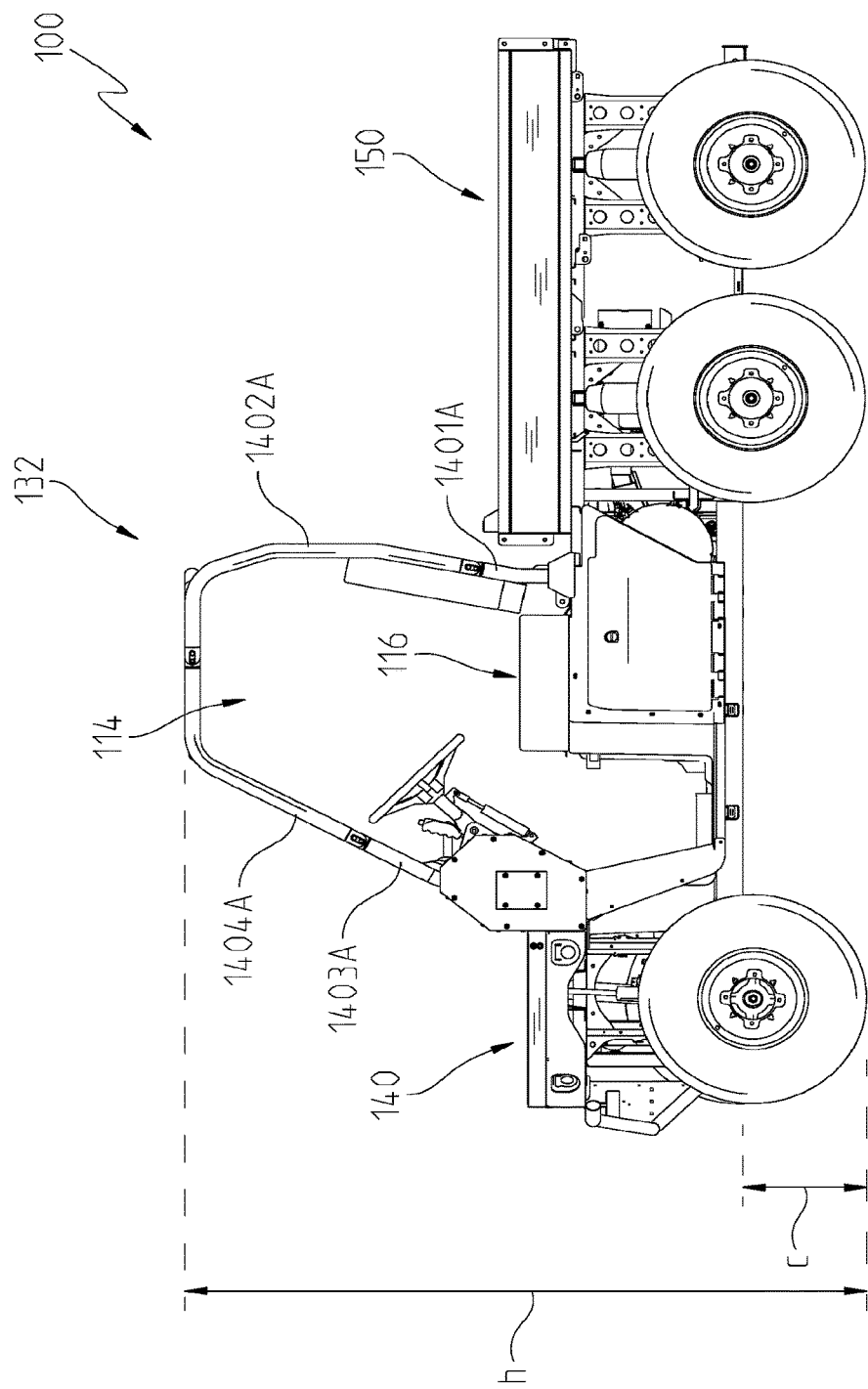
FIG. 26A is a side view of the first side of the vehicle of FIG. 1 including a first exemplary collapsible roll cage, the roll cage being in a raised configuration.

Referring to FIGS. 26A-27B, in one embodiment, roll cage 132 is collapsible. Referring to FIGS. 26A and 26B, roll cage 132 is shown in a raised position. With roll cage 132 in the raised position of FIGS. 26A and 26B, vehicle 100 has an overall height "h" of about 75 inches. Vehicle 100 also has a ground clearance "c" of about at least 7 inches.

Figure 26B:
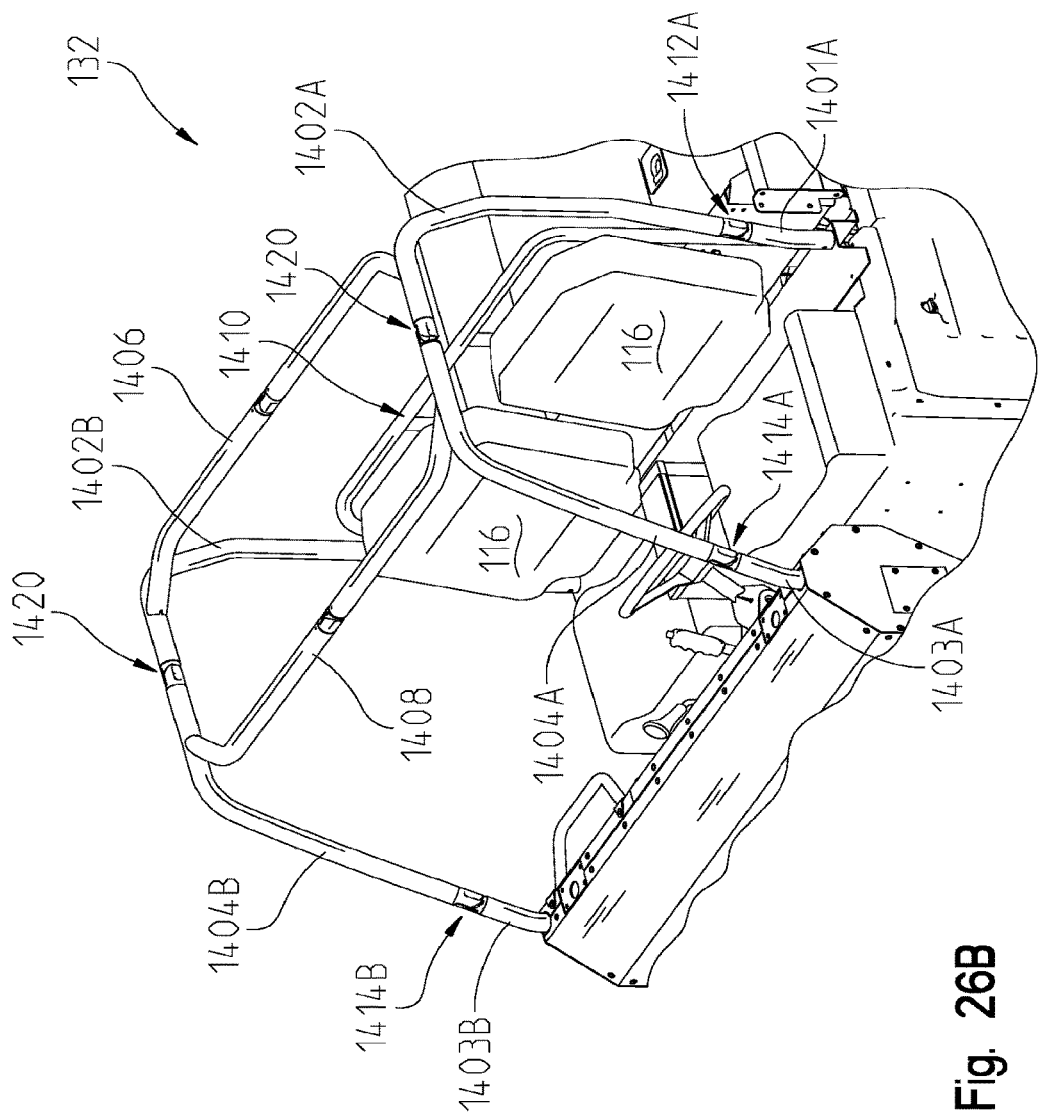
FIG. 26B is a view similar to FIG. 26A showing the roll cage in a raised configuration.

Referring to FIG. 26B, roll cage 132 includes a pair of rear, lower frame members 1401A and 1401B, a pair of rear, upper frame members 1402A and 1402B, a pair of front, lower frame members 1403A and 1403B, a pair of front, upper frame members 1404A and 1404B, a rear, cross frame member 1406, and a front, cross frame member 1408. Rear, lower frame members 1401A and 1401B are coupled to the base frame of the vehicle and rear, upper frame members 1402A and 1402B are rotatably coupled to rear, lower frame members 1401A and 1401B at hinges 1412A and a similar hinge on the passenger side of vehicle 100. Front, lower frame members 1403A and 1403B are coupled to the base frame of the vehicle and rear, upper frame members 1404A and 1404B are rotatably coupled to rear, lower frame members 1403A and 1403B at hinges 1414A and 1414B.

In one embodiment, hinges 1412 and 1414 include a lock member to lock the respective frame members in the position shown in FIG. 26B. In one embodiment, the lock member is a bolt received in aligned apertures of the respective frame members to lock the orientation of the respective upper frame member to the lower frame member. In one embodiment, the lock member is a quick release member. Additional exemplary lock members include pins and other suitable lock members.

Rear, upper frame members 1402A and 1402B are coupled to the respective front upper frame members 1404A and 1404B through couplers 1420. In one embodiment, couplers 1420 are bolts received in aligned apertures of the respective frame members. In one embodiment, couplers 1420 are quick release members. Additional exemplary couplers include pins and other suitable couplers.

Figure 27A:
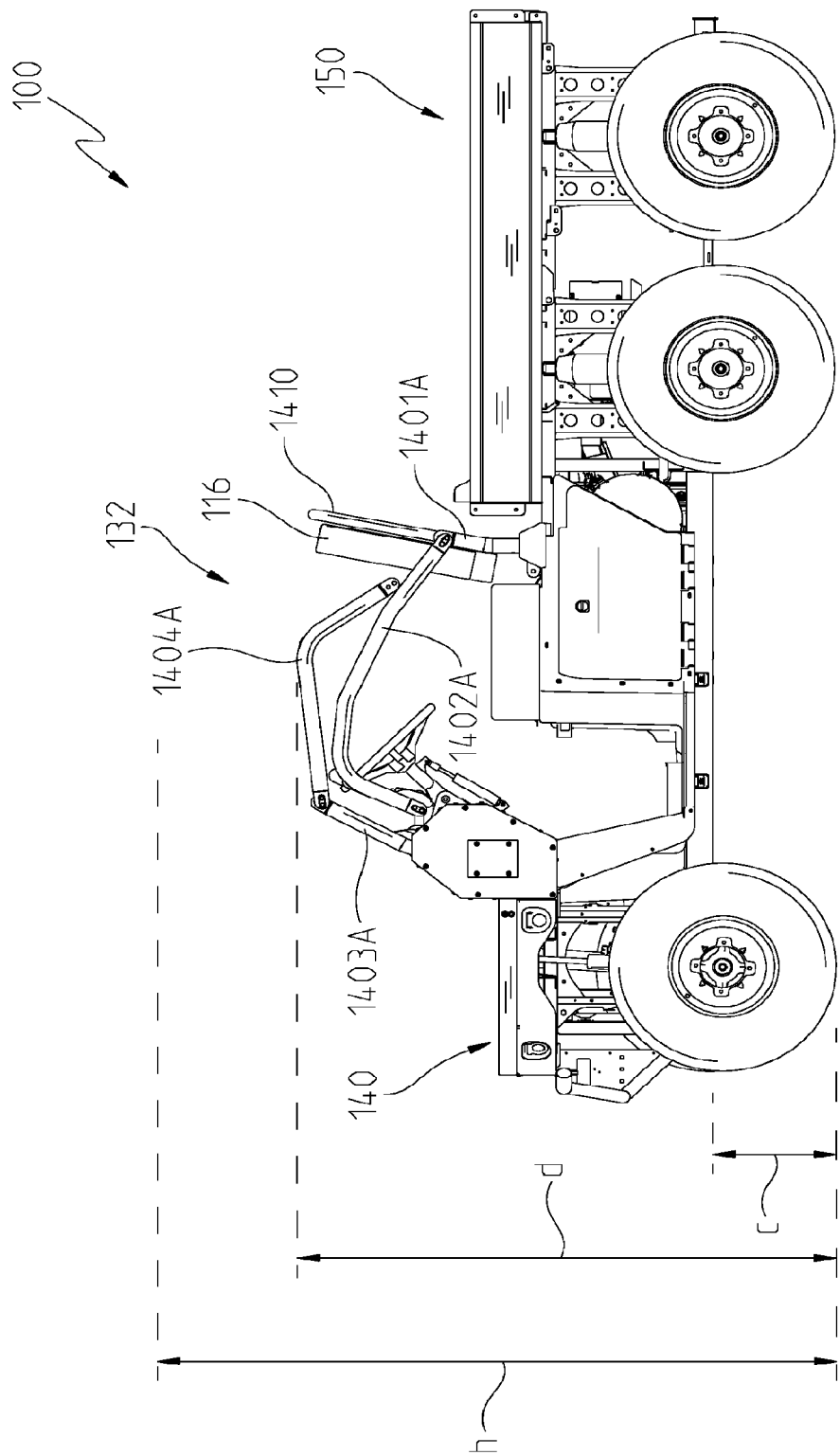
FIG. 27A is the side view of FIG. 26A with the roll cage being in a lowered configuration.
Figure 27B:
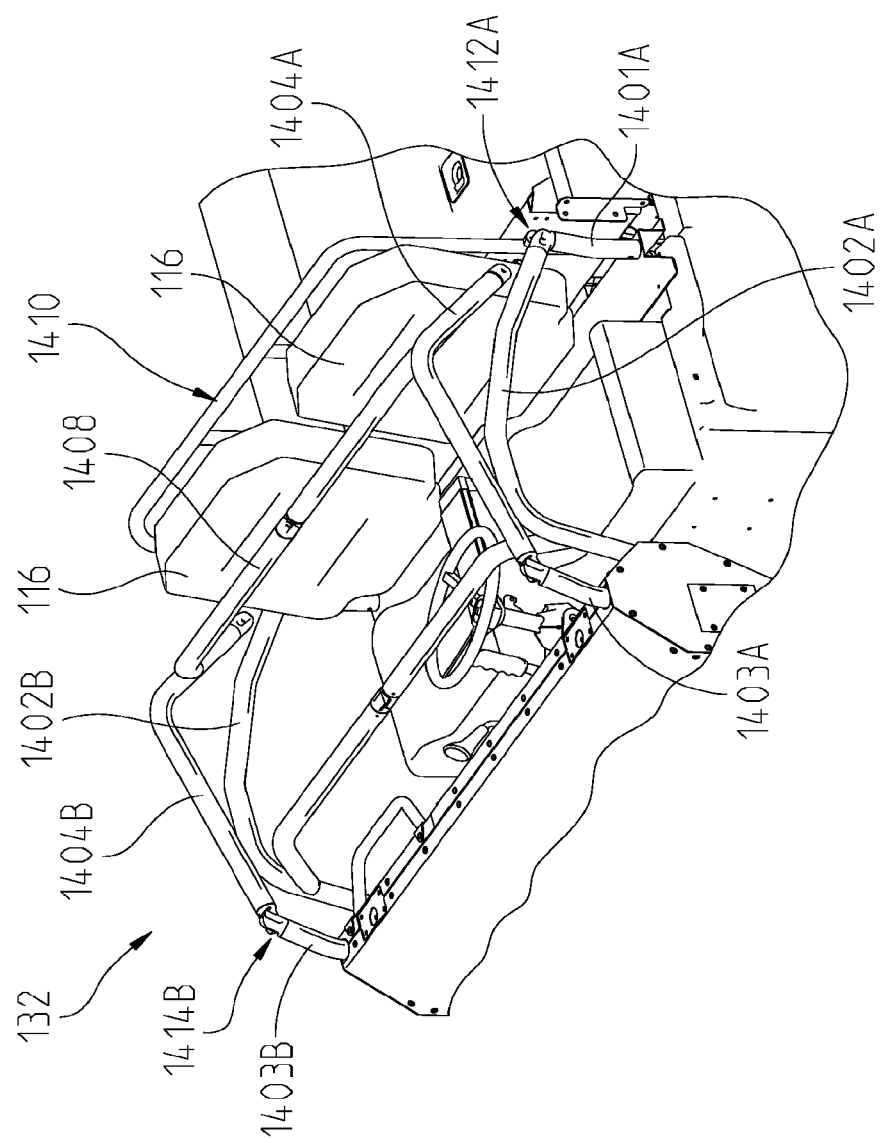
FIG. 27B is a view similar to FIG. 27A showing the roll cage in a lowered configuration.
Figure 28A:
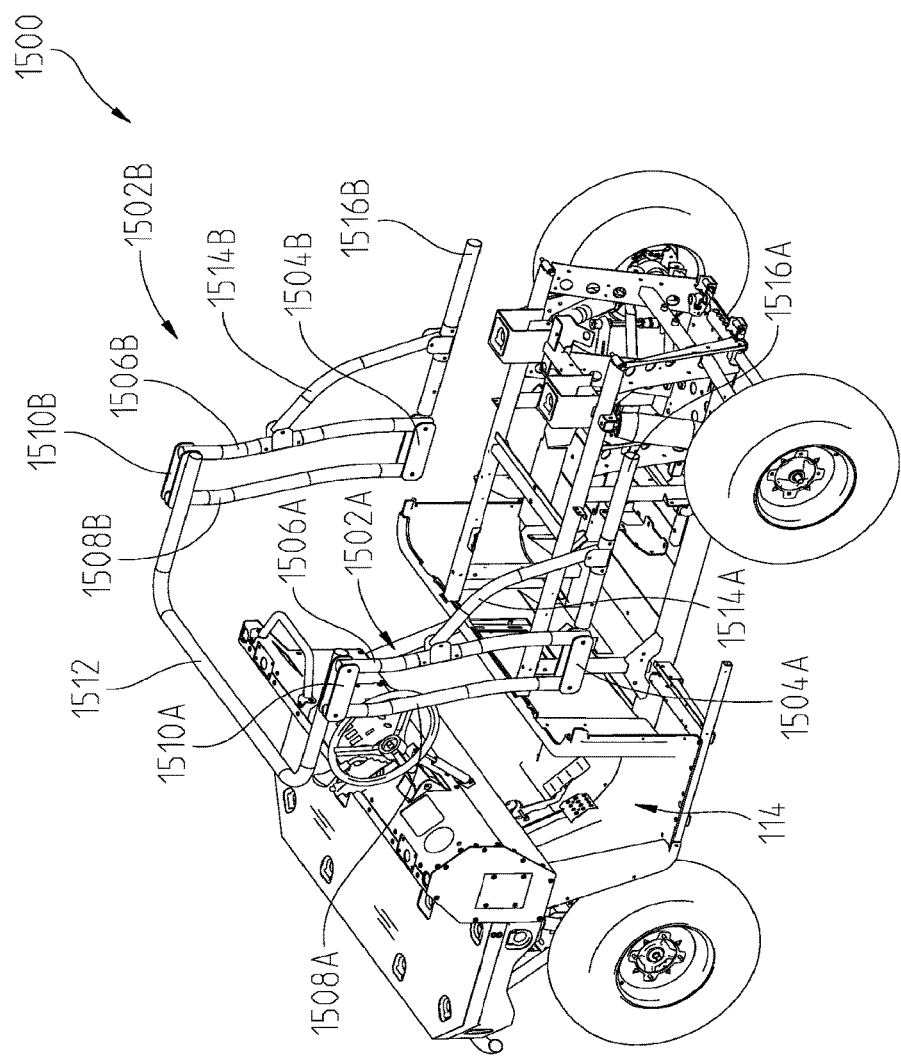
FIG. 28A is a front perspective view of a second exemplary collapsible roll cage, the roll cage being in a raised configuration.

Referring to FIGS. 27A and 27B, roll cage 132 is shown in a lowered position. In the lowered position, vehicle 100 has an overall height "d" of up to about 60 inches. Vehicle 100 also has a ground clearance "c" of about at least 7 inches. By collapsing roll cage 132, vehicle 100 may be placed in areas that have a smaller height envelope, such as the transport hold of an airplane. As best shown in FIG. 27B, a seat frame 1410 does not rotate with upper frame members 1402A and 1402B. As such, seats 116 remain in the same position regardless of whether roll cage 132 is in the raised position of FIGS. 26A and 26B or the lowered position of FIGS. 27A and 27B. Further, the openness of rear, upper frame members 1402A and 1402B and front, upper frame members 1404A and 1404B allow an operator to sit in seat 116 and drive vehicle 100 into a transport hold of an airplane.

By having both the front portion and the rear portion of roll cage 132 rotate towards each other, roll cage 132 may be moved to the lowered position while front platform 140 and rear platform 150 are fully loaded with cargo.

Roll cage 132 is moved from the raised position to the lowered position in the following manner. First couplers 1420 are removed or otherwise manipulated to uncouple rear, upper frame members 1402A and 1402B from the respective front, upper frame members 1404A and 1404B. Second, the lock members of hinges 1412 are removed, in the case of bolts, or otherwise manipulated to permit the rotation of rear, upper frame members 1402A and 1402B relative to rear, lower frame members 1401A and 1401B. Rear, upper frame members 1402A and 1402B may now be rotated forward to lower rear upper frame members 1402A and 1402B relative to rear, lower frame members 1401A and 1401B. Third, the lock members of hinges 1414 are removed, in the case of bolts, or otherwise manipulated to permit the rotation of front, upper frame members 1404A and 1404B relative to front, lower frame members 1403A and 1403B. Front, upper frame members 1404A and 1404B may now be rotated forward to lower front upper frame members 1404A and 1404B relative to front lower frame members 1403A and 1403B.

In one embodiment, roll cage 132 is held in the lowered position by straps, such as bungees, wrapped around roll cage 132 and coupled to the frame of vehicle 100. In one embodiment, roll cage 132 is held in the lowered position by coupling the uncoupled portions of rear, upper frame members 1402A and 1402B and front, upper frame members 1404A and 1404B to brackets (not shown) provided in operator cab 114.

Figure 29A:
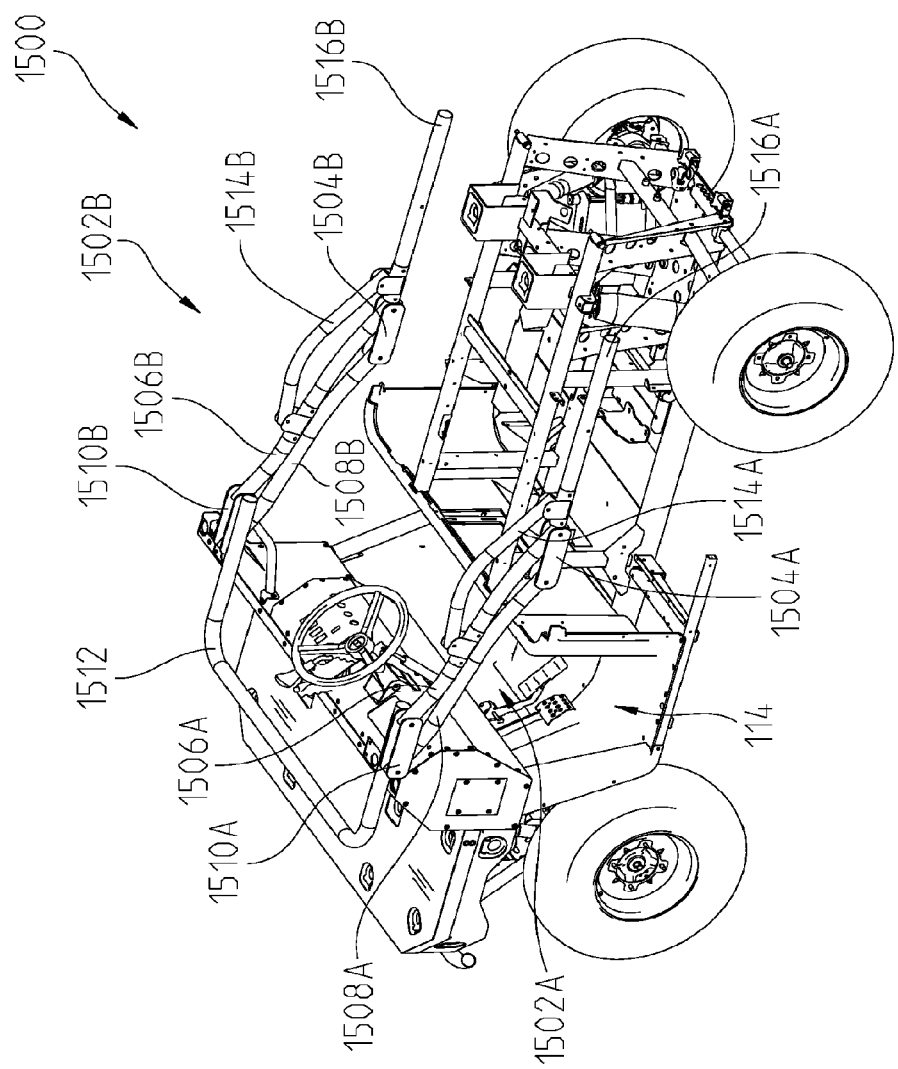
FIG. 29A is the front perspective view of FIG. 28A with the roll cage being in a lowered configuration.

Referring to FIGS. 28A-B and 29A-B, a roll cage 1500 is shown. Roll cage 1500, like roll cage 132, is moveable between a raised position (FIG. 28A) and a lowered position (FIG. 29A). Further, like roll cage 132, roll cage 1500 moves from the raised position to the lower position within the confines of operator area 114 and without moving the seats (not shown).

Roll cage 1500 includes a pair of four bar linkages 1502A and 1502B. Each four bar linkage 1502A and 1502B includes a base link 1504A and 1504B, a first upstanding link 1506A and 1506B rotatably coupled to the respective base link 1504A and 1504B, a second upstanding link 1508A and 1508B rotatably coupled to the respective base link 1504A and 1504B, and an upper link 1510A and 1510B rotatably coupled to the respective first upstanding link 1506A and 1506B and the respective second upstanding link 1508A and 1508B. Four bar linkages 1502A and 1502B are connected through an upper frame member 1512 which extends over operator area 114.

Each of first upstanding link 1506A and 1506B of the respective four bar linkages 1502A and 1502B is coupled to a respective input link 1514A and 1514B. Each respective input link 1514A and 1514B is slidably coupled to a frame member 1516A and 1516B and may have its position fixed along the length of the respective frame members 1516A and 1516B with a lock member, such as a bolt.

Figure 29B:
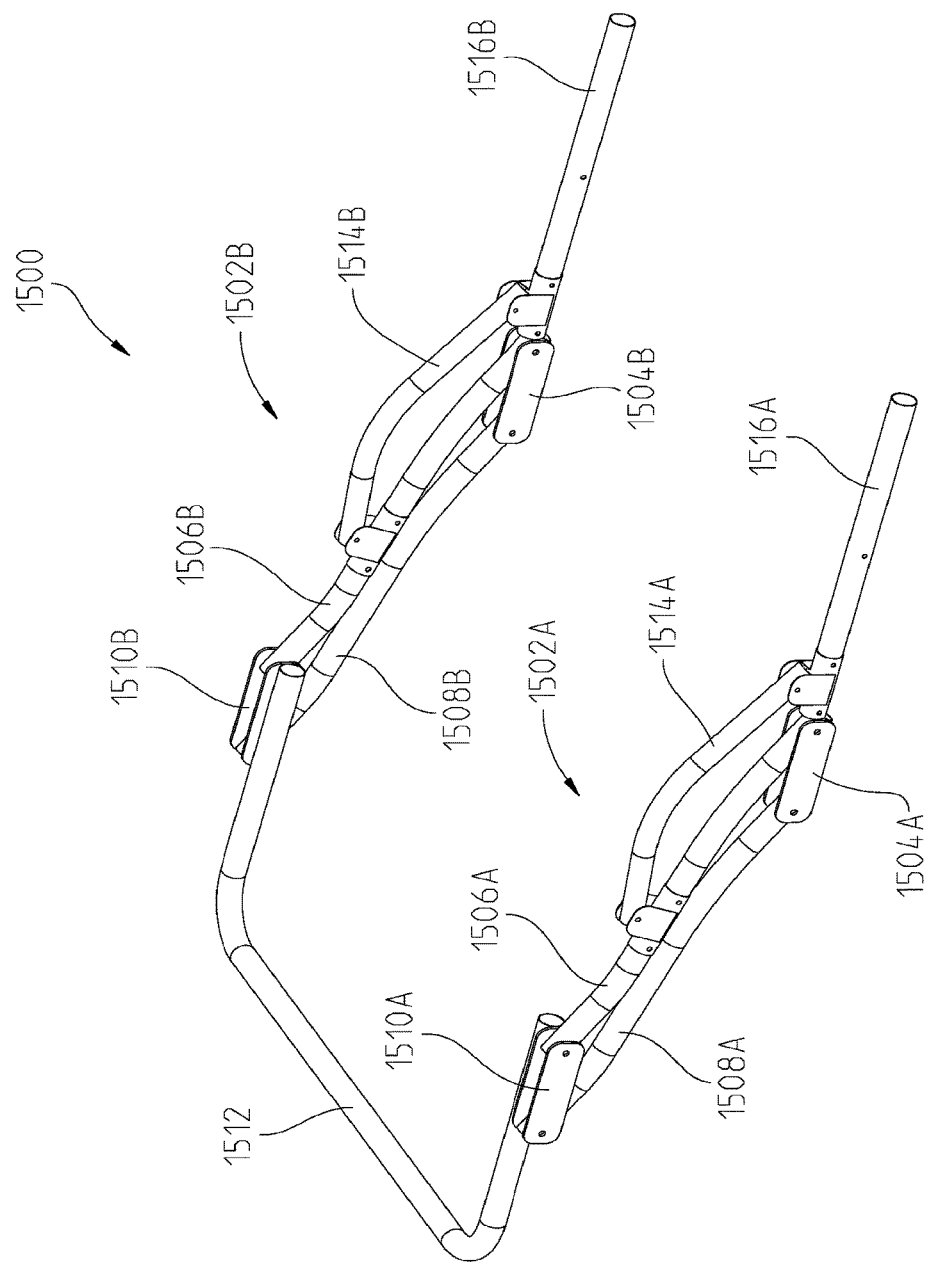
FIG. 29B is the front perspective view of FIG. 28B with the roll cage being in a lowered configuration.

As shown in FIG. 29B, by sliding input links 1514A and 1514B forward the respective four bar linkages 1502A and 1502B rotate such that the respective upper links 1510A and 1510B and frame member 1512 are lowered.

Figure 30:
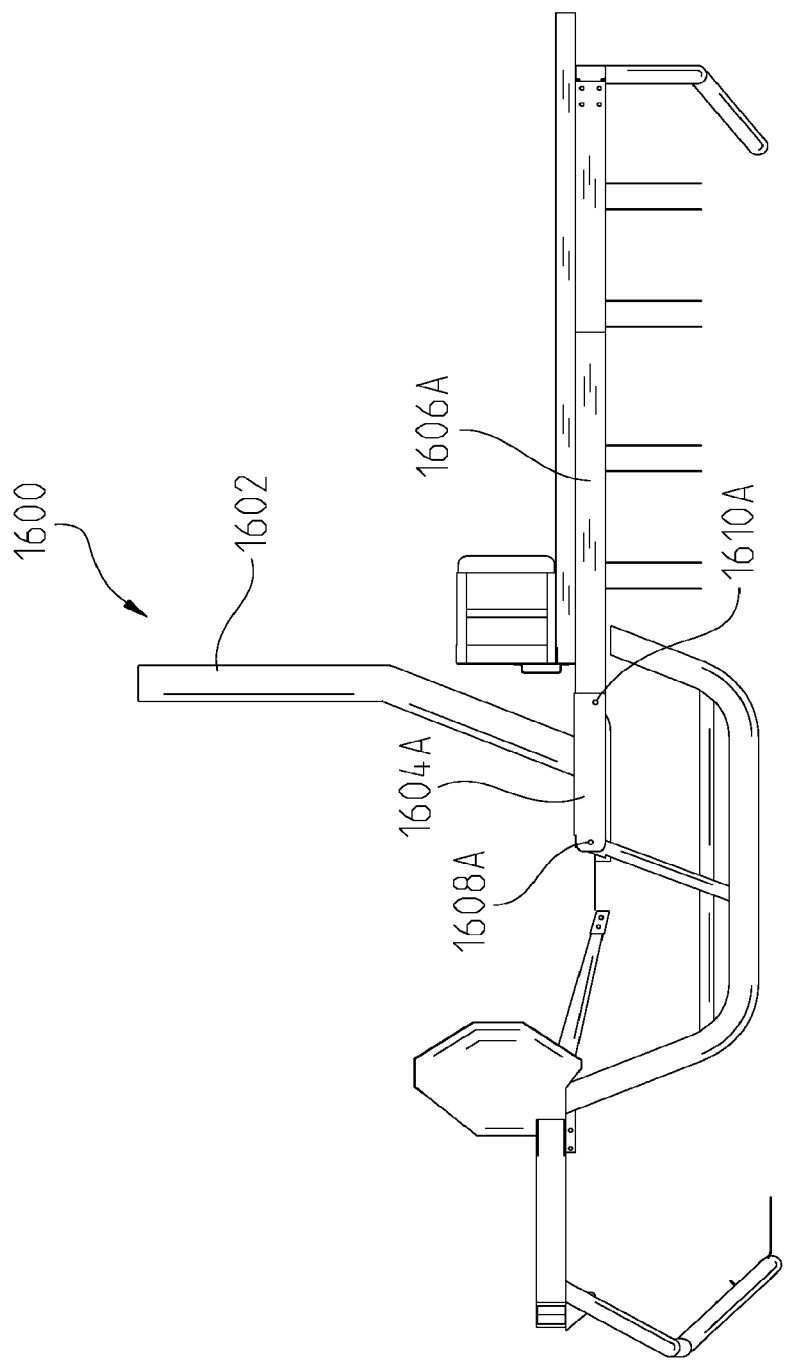
FIG. 30 is a side view of a third exemplary collapsible roll cage, the roll cage being in a raised configuration.
Figure 31:
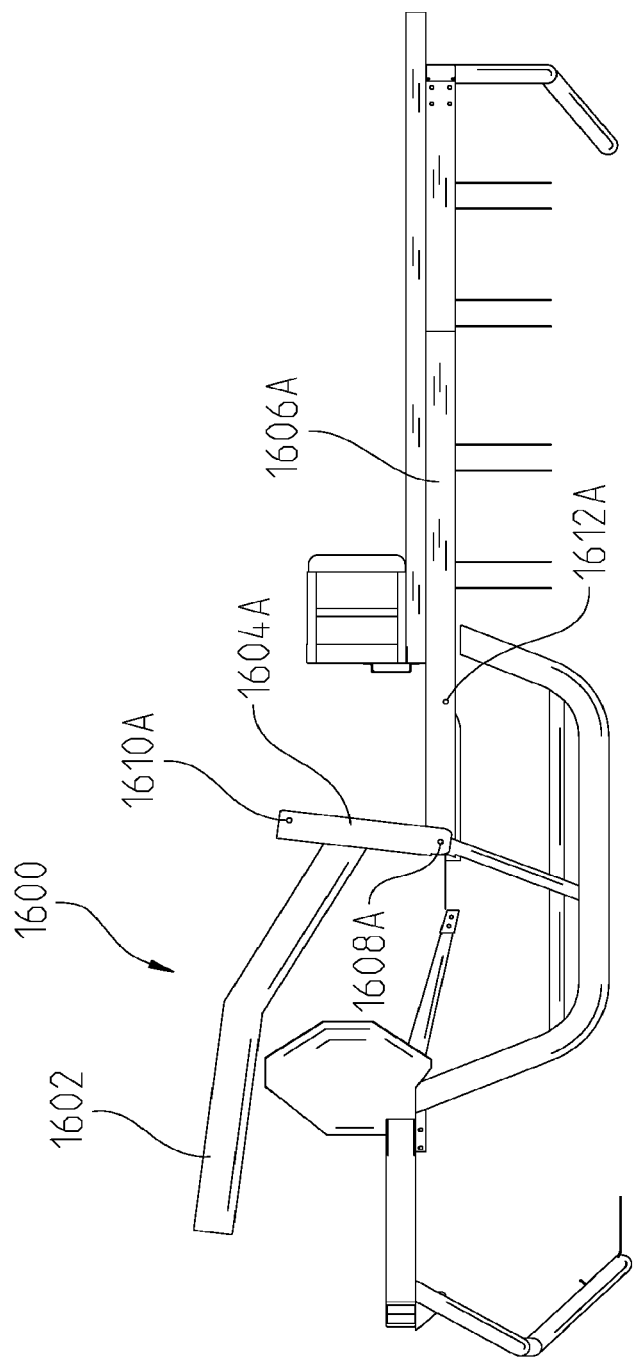
FIG. 31 is the side view of FIG. 30 with the roll cage being in a lowered configuration.

Referring to FIGS. 30 and 31, a roll cage 1600 is shown. Roll cage 1600, like roll cage 132, is moveable between a raised position (FIG. 30) and a lowered position (FIG. 31). Further, like roll cage 132, roll cage 1600 moves from the raised position to the lowered position within the confines of operator area 114 and without moving the seats (not shown).

Figure 32:
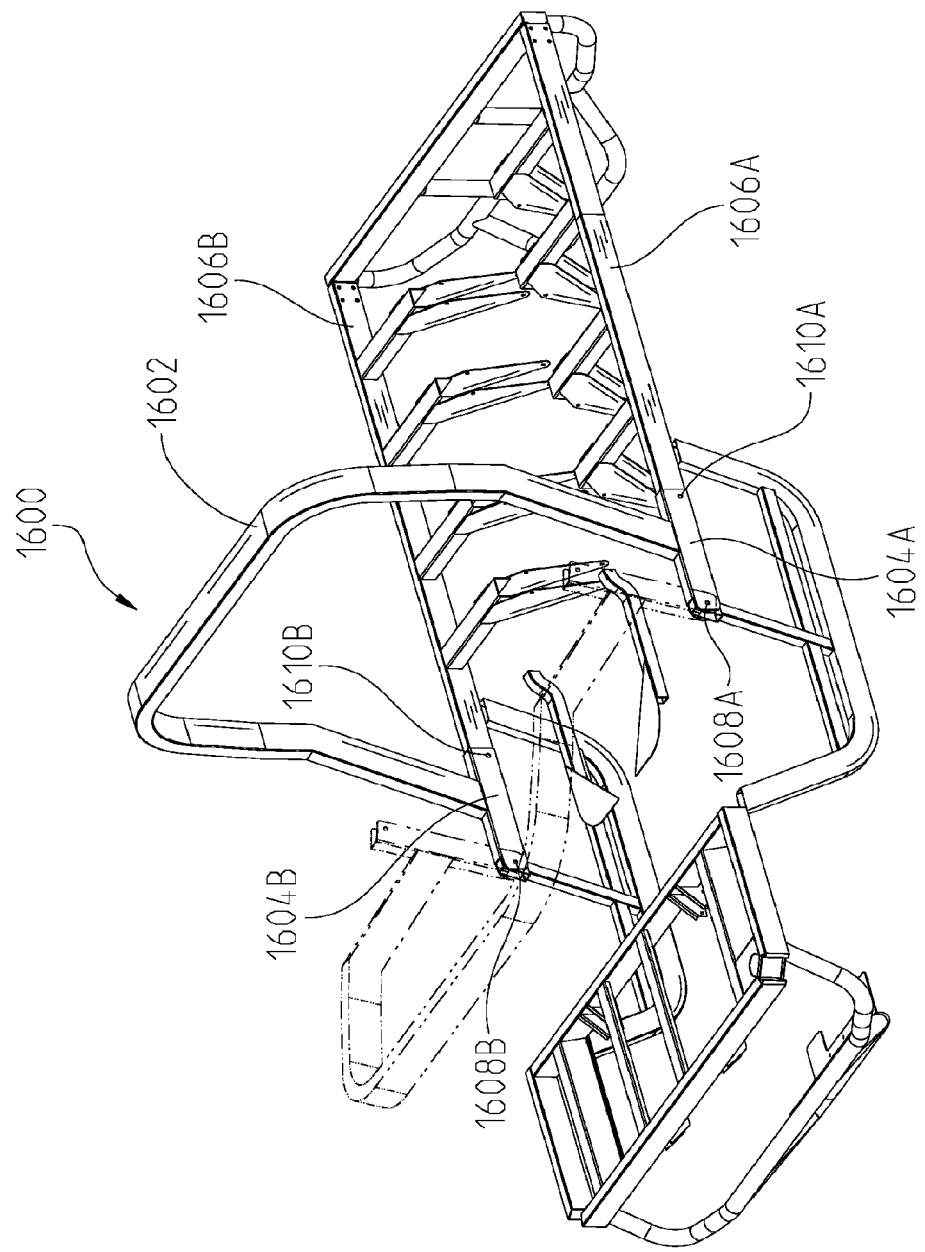
FIG. 32 is a perspective view of the roll cage of FIG. 30.

Roll cage 1600 includes a single upstanding generally u-shaped frame member 1602 which spans operator area 114 from side to side (see FIG. 32). Frame member 1602 is coupled to base frame members 1604A and 1604B. Base frame members 1604A and 1604B are generally u-shaped and include a recess into which respective frame members 1606A and 1606B are received.

Base frame members 1604A and 1604B are rotatably coupled to frame members 1606A and 1606B at 1608A and 1608B. Roll cage 1600 is shown in a raised position in FIG. 30 and FIG. 32. Roll cage 1600 is shown in a lowered position in FIG. 31 and in phantom in FIG. 32.

A respective lock member, such as a bolt, is received in apertures 1610A and 1610B in roll cage 1600 and in apertures 1612A and a corresponding aperture in frame member 1606B when roll cage 1600 is in the raised position of FIG. 30.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A vehicle comprising:
a plurality of ground engagement members;
a frame assembly supported by a first portion of the plurality of ground engagement members and including a lower frame assembly having a front portion and a rear portion, and the frame assembly further includes an upper frame assembly configured to pivot between a first position and a second position, and the upper frame assembly is supported by the front and rear portions of the lower frame assembly when in the first position, and is detached from the rear portion of the lower frame assembly when in the second position;
an engine supported by the frame assembly and configured to provide power to at least one of the plurality of ground engagement members;
an operator area supported by the frame assembly, the operator area including seating for at least two occupants in a side-by-side arrangement, steering controls operatively coupled to at least a portion of the plurality of ground engagement members, and engine controls operatively coupled to the engine, and the upper frame assembly extends directly over the seating of the operator area when in the first position; and
at least a first suspension system operatively coupled to a first ground engagement member and the lower frame assembly, the first suspension system including a control arm moveably coupled to the lower frame assembly and moveably coupled to the first ground engagement member.

2. The all-terrain vehicle of claim 1, wherein the upper frame assembly includes a first coupling member and the rear portion of the frame assembly includes a second coupling member, and the first and second coupling members have complementary cross-sectional shapes.

3. The all-terrain vehicle of claim 1, wherein the upper frame assembly has a pivot axis positioned above the steering controls.

4. The all-terrain vehicle of claim 1, wherein the upper frame assembly extends generally longitudinally between the front and rear portions of the frame assembly when in the first position.

5. The all-terrain vehicle of claim 4, wherein the upper frame assembly is positioned outside of the operator area when in the first and second positions.

6. An all-terrain vehicle, comprising:
a plurality of ground-engaging members;
a lower frame assembly supported by the plurality of ground-engaging members and including a front portion and a rear portion;
at least a first suspension system operatively coupled to a first ground engaging member and the lower frame assembly, the first suspension system including a control arm moveably coupled to the lower frame assembly and moveably coupled to at least one of the plurality of ground-engaging members;
an operator area including at least one seat supported by the lower frame assembly, steering controls operatively coupled to at least a portion of the plurality of ground-engaging members, and engine controls operatively coupled to an engine; and an upper frame assembly coupled to the lower frame assembly and configured to move between a first position and a second position, the upper frame assembly being positioned directly over the at least one seat of the operator area when in the first position, the upper frame assembly including at least a first member configured to pivot in a first direction when moving between the first and second positions and a second member configured to pivot in a second direction when moving between the first and second positions.

7. The all-terrain vehicle of claim 6, wherein the first member has a first coupler and the second member has a second coupler, and the first and second couplers have complementary cross-sectional shapes.

8. The all-terrain vehicle of claim 6, wherein at least one of the first and second frame members has a pivot axis positioned above the steering controls.

9. The all-terrain vehicle of claim 6, wherein at least a portion of the first and second frame members is positioned outside of the operator area when in the second position.

10. The all-terrain vehicle of claim 6, wherein the first and second members are positioned forward of the at least one seat when in the second position.

11. The all-terrain vehicle of claim 10, wherein the first and second members are coupled to each other in the first and second positions.

12. An all-terrain vehicle, comprising:
a plurality of ground-engaging members;
a lower frame assembly supported by the plurality of ground-engaging members and including a front portion and a rear portion;
at least a first suspension system operatively coupled to a first of the plurality of ground engaging members and the lower frame assembly, the first suspension system including a control arm moveably coupled to the lower frame assembly and moveably coupled to said first of the plurality of ground-engaging members;
an operator area including seating for at least two occupants in a side-by-side arrangement, steering controls operatively coupled to at least a portion of the plurality of ground-engaging members, engine controls operatively coupled to the engine, a dash assembly supporting at least a portion of the steering controls and the engine controls, and a footwell extending forward from the seating; and
an upper frame assembly coupled to the lower frame assembly and configured to move between a first position and a second position, the upper frame assembly including a first member positioned a first distance from the dash assembly when the upper frame assembly is in the first position and positioned a second distance from the dash assembly when the upper frame assembly is in the second position, the first distance being greater than the second distance, wherein the first member of the upper frame assembly abuts the dash assembly when the upper frame assembly is in the second position.

13. The vehicle of claim 12, wherein the first member is configured to at least partially extend over the footwell when in one of the first and second positions and the first member is configured to be spaced apart from the footwell when in the other of the first and second positions.

14. An all-terrain vehicle, comprising:
a plurality of ground-engaging members;
a lower frame assembly supported by the plurality of ground-engaging members and including a front portion and a rear portion;
at least a first suspension system operatively coupled to a first ground engaging member and the lower frame assembly, the first suspension system including a control arm moveably coupled to the lower frame assembly and moveably coupled to at least one of the plurality of ground-engaging members;
an operator area including seating for at least two occupants in a side-by-side arrangement, steering controls operatively coupled to at least a portion of the plurality of ground-engaging members, engine controls operatively coupled to an engine, a dash assembly supporting at least a portion of the steering controls and the engine controls, and a footwell extending forward from the seating; and
an upper frame assembly coupled to the lower frame assembly and configured to move between a first position and a second position, the upper frame assembly including a first member positioned a first distance from the dash assembly when the upper frame assembly is in the first position and positioned a second distance from the dash assembly when the upper frame assembly is in the second position, the first distance being greater than the second distance, wherein the upper frame assembly permits ingress and egress to a driver's side of the vehicle when in the first position and inhibits ingress and egress to the driver's side when in the second position.

15. The vehicle of claim 14, wherein the first member is configured to at least partially extend over the footwell when in one of the first and second positions and the first member is configured to be spaced apart from the footwell when in the other of the first and second positions.

* * * * *